United States Patent
Clithero et al.

(10) Patent No.: US 12,536,881 B1
(45) Date of Patent: Jan. 27, 2026

(54) SYSTEMS AND METHODS FOR AUTOMATED TELLER MACHINE REPLENISHING AND MERCHANT OPERATIONS

(71) Applicant: Wells Fargo Bank, N.A., San Francisco, CA (US)

(72) Inventors: Keith Clithero, Charlotte, NC (US); Darren M. Goetz, Salinas, CA (US); Margaret Honeycutt, Crockett, CA (US); Dennis E. Montenegro, Concord, CA (US); Pankaj Parekh, San Francisco, CA (US); Ashleigh Raynes, Charlotte, NC (US); Dominik Vltavsky, Belmont, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 889 days.

(21) Appl. No.: 17/525,734

(22) Filed: Nov. 12, 2021

Related U.S. Application Data

(63) Continuation of application No. 17/525,460, filed on Nov. 12, 2021, now Pat. No. 12,223,478.

(51) Int. Cl.
*G06Q 20/18* (2012.01)
*G06Q 20/10* (2012.01)
(Continued)

(52) U.S. Cl.
CPC ....... *G07F 19/211* (2013.01); *G06Q 20/1085* (2013.01); *G06Q 20/18* (2013.01);
(Continued)

(58) Field of Classification Search
None
See application file for complete search history.

(56) References Cited

U.S. PATENT DOCUMENTS 7,860,753 B2   12/2010   Walker et al.
8,332,313 B2   12/2012   Doran et al.
(Continued)

FOREIGN PATENT DOCUMENTS

| GB | 2 499 060 A | 6/2012 |
| JP | 2018-055220 A | 4/2018 |
| WO | WO-2020/223570 A1 | 11/2020 |

OTHER PUBLICATIONS

Almuhammadi, A., "An Overview of Mobile Payments, Fintech, and Digital Wallet in Saudi Arabia," 2020, 2020 7th International Conference on Computing for Sustainable Global Development (INDIACom), pp. 271-278.
(Continued)

*Primary Examiner* — William J Jacob
(74) *Attorney, Agent, or Firm* — Foley & Lardner LLP

(57) ABSTRACT

Systems, methods, and computer-readable storage media for ATM recycling operations. One method includes communicably coupling to one or more merchant computing systems associated with one or more merchants. The method further includes receiving a product inventory dataset associated with one or more merchants. The method further includes receiving, via a display interface, an input initiating an ATM session. The method further includes generating and presenting, via the display interface of the ATM, a GUI including a plurality of interactive elements associated with a plurality of products of the product inventory dataset. The method further includes receiving, via the display interface, a selection of at least one interactive element regarding at least one product of the plurality of products. The method further includes receiving a deposit for a value of the selection. The method further includes generating a code that embeds a value, and transmitting the code for a transaction.

20 Claims, 17 Drawing Sheets

(51) Int. Cl.
  *G06Q 20/20* (2012.01)
  *G06Q 20/32* (2012.01)
  *G07F 19/00* (2006.01)

(52) U.S. Cl.
  CPC ....... *G06Q 20/203* (2013.01); *G06Q 20/3276* (2013.01); *G07F 19/206* (2013.01); *G07F 19/209* (2013.01)

(56) References Cited

U.S. PATENT DOCUMENTS

| | | | |
|---|---|---|---|
| 8,370,210 | B2 | 2/2013 | Grunski et al. |
| 9,037,513 | B2 | 5/2015 | Rosenblatt et al. |
| 10,134,232 | B2 | 11/2018 | Preisach |
| 10,223,866 | B2 | 3/2019 | Warner et al. |
| 10,716,675 | B2 | 7/2020 | Yahn et al. |
| 10,720,014 | B1 | 7/2020 | Jordan et al. |
| 10,878,399 | B1* | 12/2020 | Joglekar ............ G06Q 30/0207 |
| 11,410,215 | B1 | 8/2022 | Goetz et al. |
| 2002/0032655 | A1* | 3/2002 | Antonin ................ G07F 19/207 705/43 |
| 2002/0152123 | A1* | 10/2002 | Giordano ............... G06Q 20/20 705/14.36 |
| 2003/0089770 | A1* | 5/2003 | Veeneman ........... G07G 1/0045 235/383 |
| 2004/0220964 | A1* | 11/2004 | Shiftan ................ G06Q 20/346 |
| 2006/0038004 | A1* | 2/2006 | Rielly ............... G06Q 30/0207 235/379 |
| 2007/0203835 | A1* | 8/2007 | Cai ........................ G06Q 40/00 705/43 |
| 2011/0047024 | A1 | 2/2011 | Anstee |
| 2011/0246316 | A1* | 10/2011 | Cincera ................ G06Q 20/204 705/17 |
| 2012/0047070 | A1* | 2/2012 | Pharris ............... G06Q 20/3227 705/42 |
| 2012/0323658 | A1* | 12/2012 | Zhou ................... G06Q 30/0239 705/14.23 |
| 2013/0226794 | A1 | 8/2013 | Englebardt |
| 2014/0006134 | A1 | 1/2014 | Lin et al. |
| 2014/0279465 | A1 | 9/2014 | Capps |
| 2015/0006351 | A1 | 1/2015 | Dickerson-Wright |
| 2015/0199683 | A1 | 7/2015 | Incedayi |
| 2015/0348169 | A1 | 12/2015 | Harris et al. |
| 2016/0012465 | A1 | 1/2016 | Sharp |
| 2016/0048816 | A1* | 2/2016 | Friedman ........... G06Q 20/1085 705/43 |
| 2016/0155101 | A1 | 6/2016 | Zelkind et al. |
| 2016/0292788 | A1 | 10/2016 | Grasso |
| 2017/0278183 | A1* | 9/2017 | Snapp ..................... G06Q 20/20 |
| 2019/0057368 | A1 | 2/2019 | Jain |
| 2019/0122492 | A1 | 4/2019 | Nguyen |
| 2020/0311703 | A1 | 10/2020 | Fellows |
| 2020/0342442 | A1* | 10/2020 | Curtis .................... G06Q 20/34 |
| 2021/0090389 | A1 | 3/2021 | Shepherd et al. |
| 2022/0036344 | A1 | 2/2022 | Vukich et al. |
| 2022/0301001 | A1* | 9/2022 | Patil ................... G06Q 30/0237 |

OTHER PUBLICATIONS

Karnouskos et al. "Mobile Payment: A Journey Through Existing Procedures and Standardization Initiatives," 2004, IEEE V Communications Surveys & Tutorials, vol. 6, Issue 4, pp. 44-66.

* cited by examiner

SYSTEMS AND METHODS FOR AUTOMATED TELLER MACHINE REPLENISHING AND MERCHANT OPERATIONS

CROSS-REFERENCE TO RELATED APPLICATIONS AND CLAIM OF PRIORITY

This application is a continuation of U.S. patent application Ser. No. 17/525,460 entitled "Systems and Methods for Automated Teller Machine Recycling and Merchant Operations," filed on Nov. 12, 2021, which is incorporated herein by reference in its entirety and for all purposes.

TECHNICAL FIELD

The present disclosure relates to the field of automated teller machines (ATMs). More particularly, the present disclosure relates to providing and enabling remote product transactions via ATMs and enabling merchant operations via ATMs.

BACKGROUND

Merchants accept payments in exchange for products and services. Accepting payments can include accepting one or more payment methods (e.g., credit card, cash, checks, mobile payment, etc.). Some merchants routinely accept physical currency (e.g., cash) for products or services. While this may accommodate many customers, accepting physical currency can also create a problem for many merchants who now must devise systems and methods to handle the received physical currency. Further and technologically, this handling becomes ripe for inaccurate bookkeeping as humans must typically physically enter physical currency deposits into their bookkeeping program in order to maintain accurate records. Moreover, the storage of physical currency also functions to make the merchant more of a target for potential bad actors, such as thieves.

SUMMARY

One embodiment relates to an automated teller machine (ATM) with at least one processing circuit having at least one processor coupled to at least one memory. The at least one processing circuit configured to: communicably couple to one or more merchant computing systems associated with one or more merchants; receive a product inventory dataset associated with one or more merchants from the one or more merchant computing systems; receive, via a display interface of the ATM, an input initiating an ATM session; generate and present, via the display interface of the ATM, a graphical user interface including a plurality of interactive elements associated with a plurality of products of the product inventory dataset; receive, via the display interface, a selection of at least one interactive element of the plurality of interactive elements regarding at least one product of the plurality of products; receive a deposit for a value of the selection; generate a code that embeds a value associated with the deposit and a unique identifier; and transmit, to a user device, the code for a transaction regarding the at least one product of the plurality of products.

In some arrangements, the at least one processing circuit is further configured to: update the product inventory dataset, wherein the product inventory dataset includes an amount of inventory associated with each product of the plurality of products. In various arrangements, the at least one processing circuit is further configured to: establish, utilizing a first application programming interface (API), a first communication session between the one or more merchant computing systems and the at least one processing circuit, wherein the at least one processing circuit and the one or more merchant computing systems exchange information via the first API. In some arrangements, the at least one processing circuit is further configured to: monitor, the one or more merchant computing systems via the first API in real-time or near real-time, product inventory of the plurality of products; and in response to identifying an update in the product inventory, update, in real-time or near real-time, the product inventory dataset. In various arrangements, the at least one processing circuit is further configured to: establish, utilizing a second application programming interface (API), a second communication session between the user device and the at least one processing circuit, wherein the at least one processing circuit and the user device exchange information via the second API. In some arrangements, the ATM further includes: a printer including an output feed configured to print and dispense the code, wherein the code includes a scannable identifier. In various arrangements, the at least one processing circuit is further configured to: generate and present, via the display interface of the ATM, a plurality of merchants associated with the product inventory dataset, wherein the selection includes at least two products of the plurality of products, and wherein the at least two products are associated with at least two merchants, wherein the code includes a first code for a first product of the at least two products and a second code for a second product of the at least two products; wherein the transmission to the user device of the code includes a first transmission of the first code and a second transmission of the second code, wherein the first transmission is separate from the second transmission. In various arrangements, the first code is one of a quick response code, a bar code, or a token, and wherein the second code is one of a quick response code, a bar code, or a token. In some arrangements, the first code is different from the second code. In some arrangements, the at least one processing circuit is further configured to: present, via the display interface, a payment request for the at least two products associated with the at least two merchants; determine a value of the at least two products associated with a first merchant; determine a value of the at least two products associated with a second merchant; and update a ledger of each merchant of the at least two merchants, wherein updating the ledger includes escrowing the value of the at least two products associated with the first merchant and escrowing the value of the at least two products associated with the second merchant.

Another embodiment relates to a method. The method includes: communicably coupling to one or more merchant computing systems associated with one or more merchants; receiving a product inventory dataset associated with one or more merchants from the one or more merchant computing systems; receiving, via a display interface of the ATM, an input initiating an ATM session; generating and presenting, via the display interface of the ATM, a graphical user interface including a plurality of interactive elements associated with a plurality of products of the product inventory dataset; receiving, via the display interface, a selection of at least one interactive element of the plurality of interactive elements regarding at least one product of the plurality of products; receiving a deposit for a value of the selection; generating a code that embeds a value associated with the deposit and a unique identifier; and transmitting, by one or more processing circuits to a user device, the code for a transaction regarding the at least one product of the plurality of products.

In some arrangements, the computer-implemented method further includes: updating the product inventory dataset, wherein the product inventory dataset includes an amount of inventory associated with each product of the plurality of products. In various arrangements the computer-implemented method further including: establishing, utilizing a first application programming interface (API), a first communication session between the one or more merchant computing systems and the at least one processing circuit, wherein the at least one processing circuit and the one or more merchant computing systems exchange information via the first API. In some arrangements the computer-implemented method further including: monitoring the one or more merchant computing systems via the first API in real-time or near real-time, product inventory of the plurality of products; and in response to identifying an update in the product inventory, updating, in real-time or near real-time, the product inventory dataset. In various arrangements, the computer-implemented method further including: establishing, utilizing a second application programming interface (API), a second communication session between the user device and the at least one processing circuit, wherein the at least one processing circuit and the user device exchange information via the second API. In some arrangements, the computer-implemented method further including: generating and presenting, via the display interface of the ATM, a plurality of merchants associated with the product inventory dataset, wherein the selection includes at least two products of the plurality of products, and wherein the at least two products are associated with at least two merchants, wherein the code includes a first code for a first product of the at least two products and a second code for a second product of the at least two products; wherein the transmission to the user device of the code includes a first transmission of the first code and a second transmission of the second code, wherein the first transmission is separate from the second transmission. In various arrangements, the first code is one of a quick response code, a bar code, or a token, and wherein the second code is one of a quick response code, a bar code, or a token, and wherein the first code is different from the second code. In some arrangements, the computer-implemented method further including: presenting, via the display interface, a payment request for the at least two products associated with the at least two merchants; determining a value of the at least two products associated with a first merchant; determining a value of the at least two products associated with a second merchant; and updating a ledger of each merchant of the at least two merchants, wherein updating the ledger includes escrowing the value of the at least two products associated with the first merchant and escrowing the value of the at least two products associated with the second merchant.

Still another embodiment relates to one or more computer-readable storage media having instructions stored thereon that, when executed by at least one processing circuit, cause the at least one processing circuit to: communicably couple to one or more merchant computing systems associated with one or more merchants; receive a product inventory dataset associated with one or more merchants from the one or more merchant computing systems; receive, via a display interface of the ATM, an input initiating an ATM session; generate and present, via the display interface of the ATM, a graphical user interface including a plurality of interactive elements associated with a plurality of products of the product inventory dataset; receive, via the display interface, a selection of at least one interactive element of the plurality of interactive elements regarding at least one product of the plurality of products; receive a deposit for a value of the selection; generate a code that embeds a value associated with the deposit and a unique identifier; and transmit, to a user device, the code for a transaction regarding the at least one product of the plurality of products.

In some arrangements, the one or more computer-readable storage media of 18, having additional instructions stored thereon that, when executed by at least one processing circuit, cause the at least one processing circuit to: update the product inventory dataset, wherein the product inventory dataset includes an amount of inventory associated with each product of the plurality of products; establish, utilizing a first application programming interface (API), a first communication session between the one or more merchant computing systems and the at least one processing circuit, wherein the at least one processing circuit and the one or more merchant computing systems exchange information via the first API; monitor, the one or more merchant computing systems via the first API in real-time or near real-time, product inventory of the plurality of products; and in response to identifying an update in the product inventory, update, in real-time or near real-time, the product inventory dataset. In various arrangements, the one or more computer-readable storage media of 18, having additional instructions stored thereon that, when executed by at least one processing circuit, cause the at least one processing circuit to: generate and present, via the display interface of the ATM, a plurality of merchants associated with the product inventory dataset, wherein the selection includes at least two products of the plurality of products, and wherein the at least two products are associated with at least two merchants, wherein the code includes a first code for a first product of the at least two products and a second code for a second product of the at least two products; wherein the transmission to the user device of the code includes a first transmission of the first code and a second transmission of the second code, wherein the first transmission is separate from the second transmission, wherein the first code is one of a quick response code, a bar code, or a token, and wherein the second code is one of a quick response code, a bar code, or a token.

Figure 1:
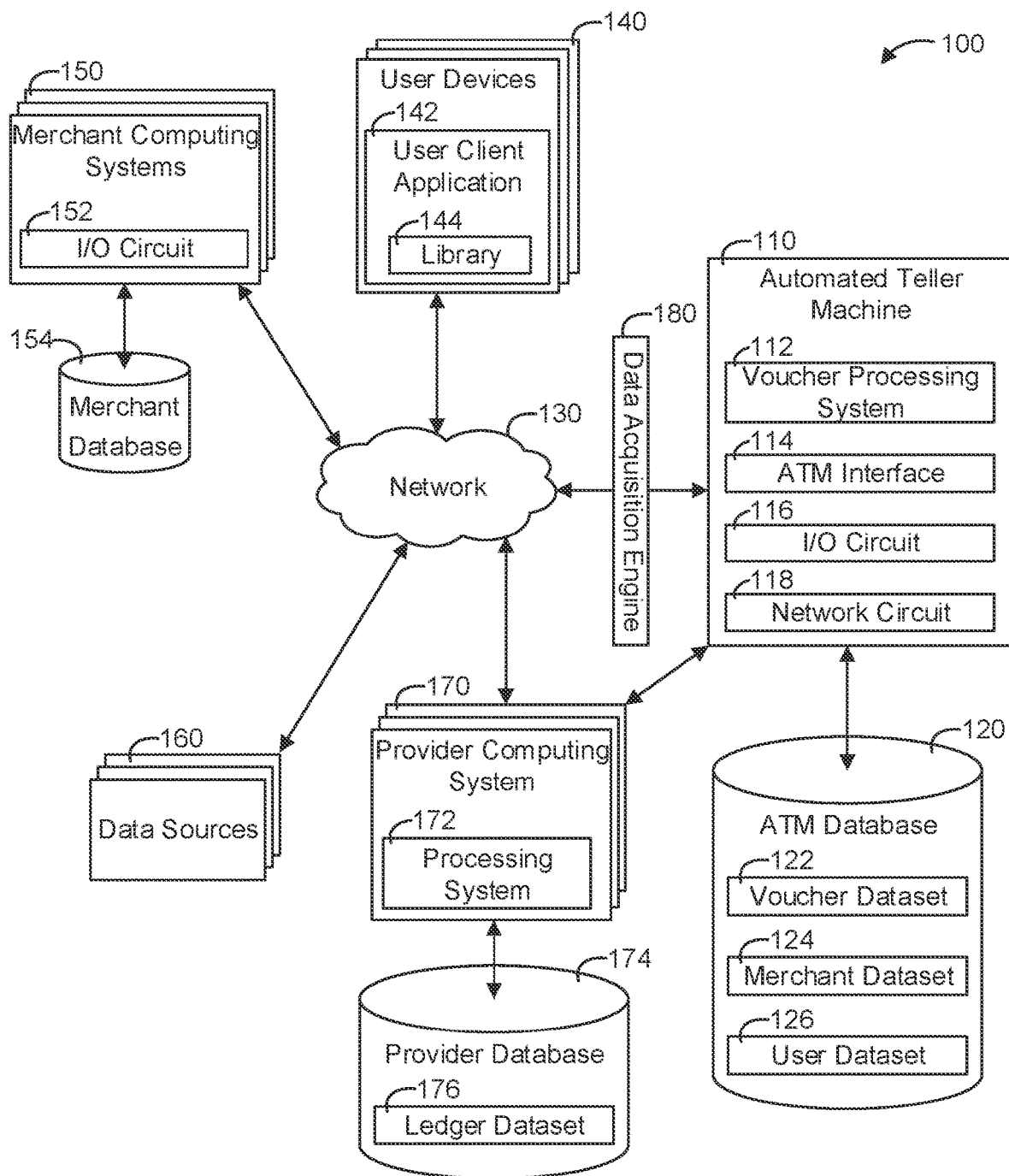
FIG. 1 is a block diagram depicting an example of an automated teller machine (ATM) and a computing environment, according to some arrangements.

It will be recognized that some or all the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the Figures, the systems and methods described herein relate to replenishing physical currency of an automated teller machine (ATM) based on issuing activated merchant vouchers. In particular, the system and methods relate to issuing activated merchant vouchers in exchange for physical currency to address the downtime and replenishment issues associated with ATMs. Thus, by addressing downtime issues with maintaining and securing physical currency at an ATM along with the other features and aspects described herein, the systems and methods of this technical solution can reduce ATM downtime (e.g., when cash reserves are empty or nearly empty), mitigate security vulnerabilities with businesses and/or management companies (e.g., companies that regularly handle cash and replenishing ATMs), increase the user experience (UX) of merchant customers, reduce resource consumption when businesses and/or management companies replenish ATMs, and other benefits and features.

Generally, ATMs have physical currency (e.g., cash, coins, other physical currency) reserves that need to be regularly replenished. On average an ATM has a capacity that can hold $200,000 USD, though few do. That is, since ATMs can be popular targets of bad actors (e.g., ATM thefts, ATM heists, etc.), many ATMs rarely hold their capacity and instead hold much less cash (e.g., $10,000). Furthermore, for security and maintenance purposes, the ATMs must be replenished regularly by the business (e.g., large, medium, and small) owning the ATM or a management company (e.g., third-party). While management companies are trained in replenishing the ATMs, it can still be a difficult and risky task that involves downtime of an ATM for a period of time such that they can be replenished. That is, if an ATM is not replenished prior to emptying (or close to emptying), the cash reserve of the ATM can be below a desired threshold amount (e.g., unable to dispense cash to customers) for a period of time until the management company or business replenishes it with additional cash (or other physical currency).

Accordingly, the systems and methods relate ATM operations and, particularly, replenishing physical currency in an ATM based on activated merchant vouchers. In some embodiments, the causal replenishing can include receiving merchant vouchers and/or product inventory datasets associated with merchants and initiating an ATM session whereby the ATM (or a coupled to provider institution computing system) can convert and transmit merchant vouchers to a customer for use at the merchant. That is, activated merchant vouchers can be provided in response to receiving a payment for a value of the received merchant voucher and/or selected product (or products) at the ATM. Thus and as described herein, the ATM may function like a point-of-sale device. Moreover, the depositing of physical currency at the ATM may reduce physical currency burdens of merchants because physical currency transactions at the merchant may now be reduced or mitigated.

In this regard, typically, merchants accept a plurality of payment methods to accommodate a wide range of customers (e.g., physical currency, debit/credit card, wire transfer, etc.). With regard to physical currency transactions, such as cash, cash transactions can increase several business threats such as theft of cash by employees, counterfeit money, and robbery of cash, while also increasing the costs of security, withdrawing cash from banks, transporting cash, and counting cash. Oftentimes, cash transactions can be time consuming, which can cause longer wait times by merchants and additional resource utilization by merchant computing systems (e.g., point-of-sale computers) in maintaining security of the cash (e.g., cash drawer). That is, maintaining and protecting cash by merchant computing systems can inhibit and restrict computing systems to perform additional tasks (e.g., perform additional exchanges). Furthermore, cash exchanges without the country's (or merchants) currency of choice can require additional resource utilization by merchant computing systems in accessing exchange rates and calculating exchange rates. Accordingly and with the drawbacks in accepting cash, many merchants have turned to prioritizing cashless exchanges (e.g., banking cards, contactless payments, mobile wallets). However, some customers may still desire to perform cash transactions. Thus, to improve the performance of merchant computing systems while reducing resource utilization associated with cash management and security, the systems and methods described herein can allow customers to perform cash exchanges/transactions at automated teller machines. Accordingly, the ability for merchants to go cashless while indirectly replenishing ATMs with cash (i.e., physical currency), provides merchant computing systems and ATMs improved security and resource utilization while reducing downtime and cash handling difficulties. Thus, the causal systems and methods utilizing activated merchant vouchers eliminates and/or reduces the processing load with cash exchanges and provides improved storage capacity to merchant computing systems such that additional exchanges can occur in the same period of time. Furthermore, the causal systems and methods utilizing merchant vouchers eliminates and/or reduces downtime of ATMs when the cash reserves are empty (or close to empty). Therefore, aspects of the present disclosure address problems in ATM technology and merchant exchange technology by providing a significant improvement to ATM uptime and merchant computing system resource utilization.

As used herein, a "deactivated merchant voucher" (or, "merchant voucher," or "untokenized merchant voucher") is a voucher issued by a merchant (e.g., merchant computing system 150) for a transaction for a good(s) and/or service(s) that does not indicate that the good(s) or service(s) have been paid for (i.e., the voucher is not redeemable for a good or service at the merchant). In this regard, a deactivated merchant voucher is a data structure that enables an ATM or provider institution computing system (described herein) to process and determine a value of the deactivated merchant voucher. As described herein, the merchant voucher may be converted to evidence that the customer has paid for the product and/or service defined by the merchant voucher. In turn and as used herein, an "activated merchant voucher," "tokenized activated merchant voucher," and/or "coded activated merchant voucher," when used to refer to a converted merchant voucher, refers to the evidence that the user (customer) has paid (i.e., deposited the required physical currency at the ATM) for the good(s) and/or service(s) defined by the merchant voucher. The activated merchant voucher is thus a proof of payment that enables redemption of purchased products and/or services. As described herein and in some embodiments, the activated merchant voucher may be a token (e.g., a near field communication token) and/or a code (e.g., a quick response code, a barcode, etc.). As also used herein, a "redeemed merchant voucher" is an activated merchant voucher that has been redeemed at the merchant and has no value. As also used herein, an "expired merchant voucher" is an activated or deactivated merchant voucher that has been expired based on the expiration date and has no value. In this regard, a redeemed merchant voucher or expired merchant voucher may be an activated or deactivated merchant voucher that is associated with no value and is unredeemable.

Referring now to FIG. 1, a block diagram depicting an example of an automated teller machine (ATM) 110 and a computing environment 100, according to some arrangements. As shown, the environment 100 includes a plurality of ATMs 110 coupled to an ATM database 120. The ATM 110 is coupled, via the data acquisition engine 180, to a plurality of devices and/or systems including, user devices 140, merchant computing systems 150, data sources 160, and a provider institution computing system 170. The plurality of devices and/or systems 140, 150, 170, and/or the data sources 160 may exchange and/or route (e.g., provide) data, information, etc. over a network 130. The data acquisition engine 180 may provide a single application programming interface (API) or multiple APIs to access various data generated, stored, and exchanged by the devices and systems 140, 150, 160, and 170. In various embodiments, ATM 110 and the provider computing system 170 can be implemented as separate systems or integrated within a single system (e.g., provider computing system 170 can be configured to incorporate some or all of the functions/capabilities of the ATM 110). In some embodiments, the ATM database 120 and provider database 174 can be implemented as separate databases or integrated within a single database (e.g., provider database 174 can be configured to store some or all of the data/datasets of the ATM database 120).

The one or more user devices 140 may be associated with (e.g., owned by, associated with, or otherwise used by) a user to perform various actions (e.g., on the ATM marketplace described herein) and/or access various data (e.g., deactivated merchant vouchers, activated merchant vouchers, etc.), some of which may actions may be provided and performed over a network 130. As used herein, the "user" refers to an individual operating the user device 140 who owns, manages, or is otherwise associated with the user device 140. Thus, as described herein, the user may be a customer of one or more merchants associated with one or more merchant computing systems 150. The user device 140 may be used to send data to the ATM 110 or may be used to perform various actions at an ATM, perform actions at merchant, access applications (e.g., a mobile application), and/or any other action. In some implementations, the user device 140 has enabled location services which can be tracked over network 130. Locations services may include GPS, satellite, or other technologies to determine and/or track a location of user devices 140. The user device 140 may be a mobile or stationary computing device including, but not limited to, a mobile phone, a tablet, a laptop, a wearable device, a virtual/augmented reality (VR/AR) device, and/or other suitable mobile user computing devices capable of accessing and communicating using local and/or global networks. Wearable computing devices refer to types of devices that an individual wears, including, but not limited to, a watch (e.g., a smart watch), glasses (e.g., eyeglasses, sunglasses, smart glasses, etc.), bracelet (e.g., a smart bracelet), etc.

The user device 140 is shown to include a user client application 142 (also referred to herein as a mobile client application and/or provider institution client application). In one embodiment, the user client application 142 is a mobile wallet configured to store merchant vouchers in a library 144 or within other storage of user device 140. Thus, the mobile wallet client application 142 may be provided by, coupled to, and supported by, at least partially, the provider institution computing system 170. In another embodiment, the user client application 142 is configured as a mobile banking application, which may also be provided, coupled to, and supported, at least partly, by the provider institution computing system 170. In some arrangements, the mobile application 142 may be standalone application or be incorporated with an existing application of the user device 140 (e.g., integrated into a mobile banking application, a service provider application, etc.). The mobile application 142 may be downloaded by the user device 140 prior to its usage, hard coded into a memory of the user device 140, or be a network-based or web-based interface application such that the provider institution computing system 170 may provide a web browser to access the application, which may be executed remotely from the user device 140. In the example shown, the mobile application 142 is downloaded to the user device 104 and provided by the provider institution computing system 170 via, for example, an app store for download. In the example shown, the mobile application 142 is structured as a mobile banking application and may be referred to as such herein. The mobile banking application 142 may be developed and maintained (e.g., provided with software updates on a regular or semi-regular basis) by the provider institution via the provider institution computing system 170. Accordingly, the user device 140 may include software and/or hardware capable of implementing a network-based or web-based application. For example, in some instances, the mobile application 142 includes software such as HTML, XML, WML, SGML, PHP (Hypertext Preprocessor), CGI, and like languages.

In the latter web-based instance, the user may have to log onto or access the web-based interface before usage of the application. Further, and in this regard, the mobile application 142 may be supported by the provider institution computing system 170 via one or more servers, processors, network interface circuits, etc. that transmit applications for use to the user device 140. Furthermore, prior to use of the mobile application 142 and/or at various points throughout the use of the mobile application 142, the user may be required to provide various authentication information or log-in credentials (e.g., a password, a pass code, a personal identification number (PIN), a fingerprint scan, a retinal scan, a voice sample, a face scan, any other type of biometric security scan) to ensure that the user associated with the user device 140 is authorized to use the mobile application 142.

As shown and as indicated above, the mobile client application 142 includes a library 144. The library 144 is structured as a repository (e.g., a file in the application 142 for storing certain information, instructions in the application 142 for storing certain information in a memory device of the user device 140, etc.) that may store or hold merchant vouchers (e.g., activated and/or deactivated). Furthermore, library 144 may include an API configured for communication with the plurality of ATMs 110, in particular, ATM interface 114. In another example, the library 144 may be an SDK that includes an API, a debugger, and IDE, and so on. In some implementations, library 144 includes one or more libraries having reusable functions that interface with a particular system software (e.g., iOS, Android, Linux, etc.). Library 144 may facilitate embedding functionality in user client application 142. For example, a customer may use library 144 to automatically transmit (e.g., via a secure connection) deactivated merchant vouchers to an ATM 110 when the user device 140 is within a predefined distance of the ATM 110 (e.g., 3 feet, 2 feet, etc.) or upon receiving a user request/instruction/command. In another example, a customer may use library 144 to automatically transmit (e.g., via a secure connection) activated merchant vouchers (e.g., a code and/or a token) to a merchant computing system 150 when the user device 140 is within a predefined distance of an I/O circuit 152 of the merchant computing system 150 (e.g., 3 feet, 2 feet, etc.) or upon receiving a user request.

The network 130 may include any combination of a wired and/or wireless network. Therefore, the network 130 local area network (LAN), a wide area network (WAN) (e.g., the Internet), a telephone network, such as the Public Switched Telephone Network (PSTN), a wireless link, an intranet, the Internet, a proprietary banking network, or combinations thereof. The network 130 can enable communication between various nodes, such as the ATM 110 and user devices 140. In some arrangements, data flows through the network 130 from a source node to a destination node as a flow of data packets, e.g., in the form of data packets in accordance with the Open Systems Interconnection (OSI) layers. A flow of packets may use, for example, an OSI layer-4 transport protocol such as the User Datagram Protocol (UDP), the Transmission Control Protocol (TCP), or the Stream Control Transmission Protocol (SCTP), transmitted via the network 130 layered over an OSI layer-3 network protocol such as Internet Protocol (IP), e.g., IPv4 or IPv6. The network 130 may include various network devices (nodes) communicatively linked to form one or more data communication paths between participating devices. Each networked device includes at least one network interface for receiving and/or transmitting data, typically as one or more data packets. An illustrative network 130 is the Internet; however, other networks may be used. The network 130 may be an autonomous system (AS), i.e., a network that is operated under a consistent unified routing policy (or at least appears to from outside the AS network) and is generally managed by a single administrative entity (e.g., a system operator, administrator, or administrative group).

Referring to the merchant computing systems 150, each merchant computing system 150 may be associated with (e.g., owned by, managed by, controlled by, etc.) one or more merchants. As used herein, a "merchant" refers to a company, business, or other entity including an individual that provides goods and/or services. For example, the merchant may be a hairdresser, restaurant (e.g., bar, dive, diner, etc.), stadium (e.g., hosting sports, concerts, etc.), food truck, wireless phone carrier, movie theater, store (e.g., small, medium, big-box, chain, etc.), and so on. Accordingly, the merchant may be an individual (e.g., small business owner) or a larger entity (e.g., fortune 500 company, business, institution). As described herein, the merchant computing system 150 is configured to receive a physical currency transaction request (e.g., cash, coins, other physical currency) from an individual (e.g., customer) and create a deactivated merchant voucher that can be processed by the ATM 110. The physical currency transaction request may be a request from the user device 140 for one or more goods and/or services provided by the merchant.

In various arrangements, the merchant computing system 150 can include a point-of-sale device that can include a display, an input device, and a software application. The display may be used to present transaction information, account information, voucher information, exchange information, and the like to an individual (e.g., customer). The input device may be used to provide an input to the merchant computing system 150, and/or to ATM 110 through the network 130. The input device may include a keyboard, a mouse, a touchscreen, a printer, a biometric sensor (e.g., fingerprint sensor, iris sensor, hand sensor, face sensor, keystroke sensor, signature sensor, voice sensor), a microphone, a camera (e.g., facial recognition camera), a geographic locator (e.g., global positioning system (GPS)), and so on. The software application may include program logic (e.g., stored executable instructions) configured to implement at least some of the functions described herein.

Referring now to the merchant computing system 150 in greater detail, the merchant computing system 150 may be used to perform various actions and/or access various types of data, some of which may be provided over network 130. The merchant computing system 150 may be used to send and receive data (e.g., exchange information) with ATMs 110 (e.g., product inventory dataset, real-time product inventory updates), and provide a voucher (e.g., via the I/O circuit 152) and particularly in some embodiments, a deactivated merchant voucher, to an ATM 110 and/or a user device 140 (e.g., via user client application 142). The merchant computing system 150 can include one or more processing circuits or systems that have one or more processors coupled to one or more transitory and/or non-transitory storage mediums and/or memory devices (e.g., any computer-readable storage media, such as a magnetic storage, optical storage, flash storage, RAM, and so on).

In some arrangements, each merchant computing system 150 can provide a product inventory data to ATMs 110. The product inventory data or dataset refers to data regarding products and/or services offered by the merchant (e.g., merchant identifier (e.g., a merchant category code), UPC of product and or service or other unique identifier, price information, images or other descriptions of the products and/or services, and so on). Product inventory data of the merchant may further include, but not limited to, types of services provided and the price of each service may then be provided to the proximate one or more ATMs. For example, the merchant may be a hairdresser that provides haircuts and salon services. In this example, the merchant may commission, request and in turn provide or facilitate providing one or more ATMs geographically proximate to the merchant (e.g., within a predefined distance, such as within one-thousand feet, within the merchant location itself). In turn, product inventory data of the hairdresser may be provided to the ATM(s) geographically proximate to the hairdresser. In another example, the merchant may be a phone carrier that sells phones and provides cellular services. The merchant may provide or facilitate providing one or more ATMs geographically proximate to the merchant. Product inventory data provided to the geographically proximate ATMs of the merchant may then include, but is not limited to, types of phones sold, the price of each phone, types of services provided, and the price of each service. In yet another example, the merchant may be a gas station that sells various goods. The merchant may provide or facilitate providing one or more ATMs geographically proximate the gas station (e.g., within the gas station, within a predefined distance of the gas station, etc.). The merchant may provide product inventory data to the one or more ATMs including, but not limited to, types of gas sold, the price of each type of gas, goods sold, and the price of each good. As shown, a plurality of merchant computing system 150 can provide ATM product inventory data to a plurality of ATMs.

In some arrangements, the merchant computing system 150 may provide product inventory data to a provider computing system 170 and the provider computing system 170 can interface with one or more ATMs 110 to provide product inventory data. For example, the provider computing system 170 can receive product inventory data and determine ATMs geographically proximate to the merchant(s) that provided the product inventory data, and transmit the product inventory data to each ATM determined to be geographically proximate the merchant(s). In another example, the ATM 110 can receive product inventory data directly from the merchant computing system 110 based on the ATM 110 being proximate (e.g., within a predefined distance of the merchant). In some arrangements, the provider computing system 170 can store and maintain the product inventory data of merchant dataset 124 based on receiving updated merchant product inventory data from the merchant computing system 150 and data sources 160.

In operation, each ATM 110 may be associated with a geographic location and have an associated geographic location identifier (e.g., satellite coordinates, etc.). The ATM location identifiers may be stored by the provider institution computing system 170. Alternatively, the ATM location identifiers may be stored by the provider of the ATMs, if different than the provider institution, whereby such information is periodically provided to the provider institution computing system 170. Based on the product/merchant information, the provider institution computing system can compare location information of one or more merchants relative to the location information of the ATMs to determine which ATM(s) are within a predefined distance of the one or more merchant locations (e.g., with 5 miles from the merchant computing system 150, within 1 mile, within 500 feet, etc.). Accordingly, product inventory from the merchant may be provided by the provider institution 170 and/or the merchant computing system 150 to the ATMs determined to be within the predefined distance of the merchant.

Furthermore, some ATMs 110 may be associated with an ATM communication network (e.g., group of ATMs 110 sharing data across a network such as network 130 or a private network). Thus, the merchant computing system 150 and/or provider computing system 170 can push product inventory data to specified ATM communication networks (e.g., all ATMs within a certain zip code, all ATMs within a certain city or town, associated with a particular bank or type of ATM, etc.).

Moreover, some merchants may be enrolled with a subscription service such that the merchant computing system 150 and/or provider computing system 170 can push product inventory data to each ATM 110 on a subscription. For example, the merchant, via the merchant computing system 150, may pay a periodic fee to subscribe to provide product inventory data to one or more ATMs 110 geographically proximate to the merchant location. In another example, a plurality of subscriptions associated with one or a group of ATMs may allow each merchant to subscribe to subscriptions for one or a group of ATMs, such that a merchant can provide their product inventory data to the subscribed one or more groups of ATMs in exchange for a rate (e.g., monthly, daily, by event (such as sporting, concert), etc.).

The input/output (I/O) circuit 152 of the merchant computing system 150 is configured to interact and/or facilitate interaction with a user. The I/O circuit 152 can include input, output, and/or input/output devices along with suitable circuitry. For example, the I/O circuit 152 can include any suitable input/output ports and/or use an interconnect bus (not shown) for interconnection with a local display (e.g., a touchscreen display) and/or keyboard/mouse devices (when applicable), or the like, serving as a local user interface for voucher issuance (e.g., digital and physical), data entry, retrieval, or other user interaction purposes. As such, the I/O circuit 152 may provide an interface for the user (e.g., merchant) to interact with the merchant database 154. For example, the I/O circuit 152 may include a keyboard, a keypad, a mouse, joystick, a touch screen, a microphone, a haptic sensor, a car sensor, an IoT sensor, a biometric sensor, an accelerometer sensor, a virtual reality headset, smart glasses, smart headsets, a printer, and the like. In various arrangements, the I/O circuit 152 can include a printer that can print physical vouchers (e.g., similar to receipt printing) or a virtual printer for generating virtual vouchers and providing them to user devices 140. As another example, I/O circuit 152, may include, but is not limited to, a television monitor, a computer monitor, a printer, a facsimile, a speaker, and so on. As used herein, virtual reality, augmented reality, and mixed reality may each be used interchangeably yet refer to any kind of extended reality, including virtual reality, augmented reality, and mixed reality.

In some arrangements, the merchant computing system 150 can track vouchers (e.g., deactivated merchant vouchers) received by the ATM 110 and report voucher redemptions (e.g., activated merchant vouchers, such as a code and/or a token, that have been redeemed by the user at the merchant) (e.g., to ATM 110 and/or provider computing system 170). For example, merchant computing system 150 may transmit redemption indications (or notifications) to the ATM 110 (which takes the form of an updated voucher dataset 122) or provider computing system 170. In some arrangements, the merchant computing system 150 can receive an indication of an issuance of a activated merchant voucher from an ATM 110. The merchant computing system 150 is configured to cross-reference previously issued, deactivated merchant vouchers stored in merchant database 154. In various arrangements, vouchers stored in merchant database 154 can include identifying information associated with each voucher currently issued but deactivated (e.g., from a merchant), activated merchant voucher (e.g., from an ATM), and redeemed activated merchant vouchers. The identifying information can include, but is not limited to, a voucher identifier, a timestamp (i.e., an indicator of when the voucher was generated), a value (i.e., a value of the deactivated voucher), one or more merchant products and/or services to be exchanged (i.e., transacted for), a merchant identifier (e.g., a merchant category code or other merchant identifier), etc. The voucher identifier refers to a unique numeric, alpha, alphanumeric code or value that is embedded within the voucher and stored in the merchant database 154 and/or voucher dataset 122. The voucher identifier may not be reused with more than one voucher such that relatively accurate record keeping may be provided. The voucher identifier may be associated with and therefore identify the order or transaction for one or more goods and/or services associated with a customer and a merchant. Thus, the voucher identifier may be generated by a random number generator, pseudo-random number generator, and/or the like stored by the merchant computing system or via some other means. As an example, when a customer desires to make transaction for products and/or services with physical currency (e.g., coins, cash, etc.), the merchant computing system 150 (or another processing circuit/system of the merchant computing system) can generate a deactivated merchant voucher with identifying information including a voucher identifier, as mentioned above, and issue the voucher to the customer. As described herein, the deactivated merchant voucher may be issued digitally (e.g., as a code such as a quick response or bar code, a token, etc.) and/or physically (e.g., a printed voucher from a merchant point-of-sale device).

The one or more data sources 160 may be one or more computing systems, which are third-parties relative to the merchant computing system 150 and provider institution computing system 170, that are configured to provide and store data to at least one of the user device 140, merchant computing system 150, ATM 110, or provider institution computing system 170. Thus, the data sources 160 may function as data aggregators, in some embodiments. In some arrangements, the data sources may be excluded from the system 100. The one or more data sources 160 can include data collected by the ATMs 110 and therefore can include ATM interaction data (e.g., transactions, etc.), data from the merchant computing systems 150, data from user devices 140, and/or data from the provider institution computing system 170. The data may be transaction information (e.g., revenue, receipts, profits) for particular products and/or services (e.g., product A sold by merchant J, product B sold by merchant K, product C sold by merchant L) at one or more points in time (e.g., from a particular merchant location during a predefined time period, a date range, etc.). The data may be data specific for particular merchants, third-parties, or users at one or more points in time or windows of time. The data collected may be associated with a plurality of merchants, a plurality of users, a plurality of third-parties, a specific entity, a specific user, a specific seller, and so on. Data sources 160 may also be various data aggregating systems and/or entities that collect interaction data. The ATMs 110, merchant computing system 150, and/or provider institution computing system 170 can receive interaction data from the data sources 160 via the network 130. This information may be stored as interaction data in the user dataset 126. In some arrangements, the data sources 160 can receive product inventory data provided by a merchant computing system 150 to ATMs 110. For example, while merchant computing system 150 may provide the products and/or services sold at the merchant, they may not provide descriptions of the products and/or services. In another example, the data sources 160 may one or more coupon sources for discounting the products and/or services associated with a voucher and/or ATM marketplace. In the following example, the ATM 110 can query one or more coupon sources (e.g., computing systems) to proactively determine if a discount or coupon can be applied to a product and/or service, or a merchant voucher. Accordingly, in the following example, data sources 160 can provide supplemental data such as a description of the product or service, discounts, and additional information to the ATM 110 such that a customer can be provided additional data regarding the products and/or services sold by one or more merchants.

The computing environment or system 100 is shown to further include a provider institution computing system 170 associated with (e.g., managed by, controlled by, owned by, etc.) a provider institution. In the example depicted, the provider institution is a financial institution capable of providing one or more financial products and services, such as the providing of various accounts, such as a demand deposit account, lending, money transfers, issuing credit and/or debit cards, wealth management, etc. Thus and among other capabilities, the associated provider institution computing system 170 is structured to provide or otherwise facilitate providing the one or more financial products and services to customers. As such, the provider institution may also be referred to as a financial institution herein that provides banking services to customers. For example, customers can deposit funds into accounts, withdraw funds from accounts, transfer funds between accounts, view account balances, and the like via the provider institution computing system 170. As described herein, the provider institution computing system 170 is structured to support at least some of the functions and services described below. As depicted, the provider institution computing system 170 is a backend computer system. The provider institution computing system 170 may be implemented using a computing system, such as a discrete server, a group of two or more computing devices/servers, a distributed computing network, a cloud computing network, and/or another type of computing system capable of accessing and communicating using local and/or global networks (e.g., the network 130).

The provider computing system 170 may be configured to send data to and exchange information with the ATM 110. The provider computing system 170 is also configured to store data/information of merchants and customers in provider database 174. The data stored in the provider database 174 may include personal information (e.g., names, addresses, phone numbers, and so on), authentication information (e.g., username/password combinations, device authentication tokens, security question answers, unique client identifiers, biometric data, geographic data, social media data, and so on), and/or financial information (e.g., token information, account numbers, account balances, voucher identifiers, available credit, credit history, exchange histories, voucher histories, and so on) regarding users, merchants, and associated accounts of the users and merchants.

The provider computing system 170 can include one or more processors (e.g., any general purpose or special purpose processor), and include and/or be operably coupled to one or more transitory and/or non-transitory storage mediums and/or memory devices (e.g., any computer-readable storage media, such as a magnetic storage, optical storage, flash storage, RAM, and so on). The memory device may store instructions, code, logic, program logic, etc. that may be executed by the provider institution computing system 170 to perform various functions described herein. Thus, the provider institution computing system 170 is configured to have various capabilities enabling various functionalities.

Each provider computing system 170 can host (e.g., provide, support, and maintain) a ledger based on a ledger dataset 174 specific to the associated provider institution. For example, a first provider may host a ledger that includes X accounts (e.g., user, merchant) while a second provider hosts a ledger that has Y accounts. As described herein, a "ledger" refers to a database or data structure that stores information relating the issuance of deactivated merchant vouchers, activated merchant vouchers, and redeemed merchant vouchers (i.e., information regarding transactions associated with merchant vouchers as well as information regarding ATM transactions). The database, in turn, may include one or more tables comprising categories of information (e.g., merchant identifiers, product identifiers, user identifiers, ATM identifiers (e.g., where the physical currency deposit occurred), location information, and so on). Beneficially, by the provider institution computing system 170 maintaining a ledger associated with a plurality of ATMs, a plurality of transactions associated with a plurality of merchants may be tracked, stored, and categorized. As a result, an improvement to data management and aggregation may be realized. As an alternate embodiment, a ledger may be stored in the local memory (or other storage location) of each ATM and then periodically transmitted to the provider institution computing system 170 for storing and updating a master/central ledger held and maintained by the provider institution computing system. As described herein, the ledger of the provider institution computing system 170 may be updated in real or near real time based on the occurrence of various events (e.g., issuance of a deactivated voucher, activation of merchant voucher based on a deposit, etc.).

The ledger dataset 176 refers to data and/or information that may populate the ledger. The ledger can include information/data regarding a plurality of accounts, transactions associated utilizing vouchers, and other transactions, that can be queried and updated by the provider computing system 170 and/or ATMs 110. In some arrangements, the ledger can include plurality of entries regarding transactions associated with accounts. The entries can include information associated with the transaction such as, but not limited to, the identifying information of the payor (e.g., customer personal information, customer financial information, etc.), identifying information of the payee (e.g., merchant personal information, merchant financial information, etc.), account identifier of the payee or payor, voucher identifier, value, date and time, geolocation of the transaction, and so on. Further, the ledger can store balances of a plurality of accounts and balances can be updated upon receiving an indication of a transaction, redemption of a voucher, a paid for voucher, etc. For example, the ledger can escrow payments for merchant vouchers and release the payment to an account of the merchant upon redemption.

In some arrangements, each account of a merchant or user contained within the ledger may have personal information (e.g., names, addresses, phone numbers, identifier, and so on) (e.g., information from the user dataset 126 that contains information specific to the users of the user devices 140), authentication information (e.g., username/password combinations, device authentication tokens, security question answers, unique client identifiers, biometric data, geographic data, social media data, and so on) (from the user dataset 126), financial information (e.g., token information, account numbers, account balances, available credit, credit history, exchange histories, voucher history, and so on) (from the user dataset 126 and/or voucher dataset which contains information relating to issued, activated, and deactivated vouchers), inventory information (e.g., description of products and/or services, price, available inventory, location, etc.) (from the merchant dataset 124 that contains information relating to the merchants), and/or payment preferences (e.g., preferred payment method, auto-payment, auto-escrow, bank account number, routing number, payment card industry (PCI) data, banking data, or personal identifiable information (PII), and so on) relating to the various merchants and/or users. Thus, the voucher dataset 122 can store refers to information regarding vouchers.

The provider computing system 170 is structured to communicate and exchange data over network 130 with one or more ATMs 110, user devices 140, and merchant computing systems 150. For example, ATM 110 may request, from provider computing system 170, account information of a merchant to issue a merchant voucher. In another example, ATM 110 may transmit an instruction to update a ledger associated with an account of a merchant or customer that is stored and hosted by provider computing system 170 based on various events or actions happening/being detected (e.g., activation of a merchant voucher). In another example, the provider computing system 170 can issue an activated merchant voucher and provide it to the ATM 110 such that it can be provided to the customer. In yet another example, the provider computing system 170 can issue an activated merchant voucher and provide it directly to the user device 140.

The provider computing system 170 is shown to include a processing system 172 structured to process transactions based on received vouchers from the merchant computing system 150 and/or ATM 110. For example, the received activated merchant voucher (i.e., the merchant voucher that is converted to a token and/or, in some embodiments, a code) can include routing numbers, account numbers, payment rail designations (e.g., wire, ACH, Zelle®, RTP, and so on), and other information to effectuate a transfer from the deposited funds in ATM 110 to a merchant (e.g., cryptocurrency public key, cryptocurrency public and private key pair, credit card, debit card, card network, and so on).

Furthermore, in one embodiment, the ATM 110 may update the ledger stored in ledger dataset 176 of the provider computing system 170 upon issuance of an activated merchant voucher. In the following example, upon redemption of the activated merchant voucher at the merchant (or ATM), the processing system 172 of the provider institution computing system 170 is configured to release the funds associated with the value of the activated merchant voucher. In another embodiments, the ATM 110 can provide a notification to the provider computing system 170 to update the ledger. In turn, the provider computing system 170 can update the ledger and notify the merchant. Releasing of funds can include transferring escrowed funds from an escrow account to an account of the merchant where the accounts may be maintained by the provider computing system 170 or by a different, separate computing system. In some embodiments, each ATM 110 can store a ledger and the processing system 172 can sync ledgers across ATMs 110 such that the ledger of ledger dataset 176 is an aggregate of all or nearly all merchant vouchers (e.g., activated, deactivated, redeemed) across a plurality of ATMs. For example, the processing system 172 can sync ledgers across ATMs 110 based on geographic location (i.e., received information regarding voucher transactions from a plurality of ATMs in a particular geographic location at various periodic times in order to sync that information with the rest of the voucher information stored by the provider institution computing system 170). Beneficially, by limiting the syncing to particular ATMs and/or regions, a relatively less amount of data is transmitted over the network to the processing system 172 at a time, which beneficially functions to limit network usage and improve bandwidth. Moreover and given the relatively smaller update as compared to syncing with all the ATMs managed by the provider institution at one time, relatively smaller processing requirements are needed for the synchronization. In another example, the processing system 172 can sync ledgers across ATMs 110 based on a merchant request to sync (e.g., when a product inventory is updated, when merchants reconcile their accounts, etc.). In yet another example, the processing system 172 can sync ledgers across ATMs 110 based on a predefined time duration (e.g., 2 weeks, 4 weeks, etc.). In some arrangements, an update to a ledger based on the ledger dataset 176 may include one or more parameters regarding the fund transfer/transaction. For example, a hold may be placed on the value of the funds in the merchant account until the activated merchant voucher is redeemed or after a period of time (e.g., expiration). In this example, a hold can be holding the funds in an escrow account of the ATM 110 or provider computing system 170.

In various arrangements, it should be appreciated that provider computing system 170 can own and maintain the ATM 110. In some arrangements, the provider computing system 170 can be linked to one or more ATMs 110 (e.g., ATM communication networks, a subset of network 130), such that when funds are deposited into an ATM 110 an account of the merchant and/or customer can be updated to reflect an exchange. Furthermore, holds can be placed on deposited funds from a customer associated with a merchant voucher such that funds may release upon redemption of the activated merchant voucher (e.g., or after a period of time such as 1 hour, 1 day, 1 week, etc.). Fund holds and fund releases can be placed on certain accounts of merchants stored in a ledger of ledger dataset 176.

The computing environment 100 is shown to include a data acquisition engine 180. In various arrangements, the ATM 110 can be communicatively and operatively coupled to the data acquisition engine 180. The data acquisition engine 180 can include one or more processing circuits configured to execute various instructions. In various arrangements, the data acquisition engine 180 can be configured to facilitate communication (e.g., via network 130) between the ATM 110, the ATM database 120, and systems and devices described herein (e.g., user devices 140, merchant computing systems 150, data sources 160, provider computing systems 170). Thus, the data acquisition engine 180 may additional include a network interface, and be structured as an interface for communications between the ATM 110 and other systems and components in FIG. 1. In other embodiments, the data acquisition engine 180 is excluded and the ATM 110 communicates directly with the merchant computing system 150, provider computing system 170, data sources 160, and/or user device 140. Regarding the data acquisition engine 180, the facilitation of communication can be implemented as an application programming interface (API) (e.g., REST API, Web API, customized API), batch files, SDK, and/or queries. In various arrangements, the data acquisition engine 180 can also be configured to control access to resources of the ATM 110 and ATM database 120.

The API can be used by the data acquisition engine 180 and/or computing systems to exchange data and make function calls in a structured format. The API may be configured to specify an appropriate communication protocol using a suitable electronic data interchange (EDI) standard or technology. The EDI standard (e.g., messaging standard and/or supporting technology) may include any of an SQL data set, a protocol buffer message stream, an instantiated class implemented in a suitable object-oriented programming language, an XML file, a text file, an Excel file, a web service message in a suitable web service message format (e.g., representational state transfer (REST), simple object access protocol (SOAP), web service definition language (WSDL), JavaScript object notation (JSON), XML remote procedure call (XML RPC)). As such, EDI messages may be implemented in any of the above or using another suitable technology.

The ATM 110 may include one or more processing circuits/systems comprising one or more processors (e.g., ASICs, other processor types described herein) and associated memory devices. The one or more processing systems may be configured to perform various functions of the ATM 110. In general, each ATM 110 can be owned, operated, and/or managed by a provider (e.g., provider institution associated with provider institution computing system 170) and/or merchant, such as a credit card issuer, a consultant, a retailer, a service provider, a business, a cash management company, and/or the like. In some implementations, the systems may be or include a voucher processing system 112, an ATM interface 114, an input/output circuit 116, and a network circuit 118. It should be understood that various implementations may include more, fewer, or different systems than illustrated in FIG. 1, and all such modifications are contemplated within the scope of the present disclosure.

The ATM 110 may enable operations including, for example, cash withdrawals, deposits, fund transfers, transactions, bill payments, and account inquiries. For clarity purposes, the following description will be in reference to a single ATM 110. However, it should be understood that any number of ATMs 110 may be utilized within the computing environment 100. Accordingly, the following description may be applied to each ATM 110 utilized within the computing environment 100. Furthermore, in the example shown, the ATM 110 is a network-enabled user-interactive device. Thus, in some embodiments, the data acquisition engine 180 may be excluded and/or included within ATM 110 itself. In some other embodiments, the ATM 110 may not contain a network circuit 110 and may not be network-enabled (e.g., the ATM 110 may include short-range protocol enabled only, such as NFC, Bluetooth®, etc.). Being networked, the ATM 110 may communicate over the network with the provider institution computing system 170 and/or user mobile device (e.g., the user devices 140).

Referring to ATMs 110 generally, each ATM 110 can be connected to an ATM communication network (e.g., implemented on network 130). An ATM communication network can include at least one ATM 110 that can be configured to be maintained collectively or individually. For example, an ATM communication network may include X ATMs associated with Bank A, where Bank A may maintain each ATM on the network collectively, individually, or a combination of both. In some instances, the ATMs 110 may periodically transmit signals through the ATM communication network at various time intervals (e.g., every second, every 10 second, every minute, etc.). For example, a first ATM and a second ATM may transmit signals through the ATM communication network responsive to converting a deactivated merchant voucher. In another example, the first ATM and the second ATM may periodically transmit signals through the ATM communication network responsive to a redemption received by merchant computing systems 150 or provider computing systems 180.

The voucher processing system 112, which may be one or more processing circuits, is configured to activate deactivated merchant vouchers for use at one or more merchants. Activating merchant vouchers refers to the process of generating or converting a deactivated merchant voucher to an activated merchant voucher. Accordingly, the voucher processing system 112 can receive the deactivated merchant voucher and convert it to at least one of a code or a token, whereby the code and/or token includes information from the deactivated merchant voucher (e.g., voucher identifier, product/service identifier, merchant identifier, timestamp, etc.), an indicator that the user/customer has made the required physical currency deposit for the identified product/service (e.g., a code that is used by the provider institution computing system 170 and/or merchant computing system 150 to verify and authorize the redemption of the token and/or code), and other information that may be needed to enable the redemption of the activated merchant voucher. As an example, the code or token may be embedded with an indicator regarding the determined value of the deactivated merchant voucher (e.g., the price plus applicable fees for the product and/or service), information regarding the merchant voucher, and a unique identifier. In some arrangements, prior to inserting the information into the token or code, the information can be encrypted. For example, the token can be a short range wireless token (e.g., NFC, Bluetooth®, etc.) that can be transmitted via the communication session with the user device 140. In another example, the code can be a scannable code (e.g., QR, bar code, numeric, alpha, alphanumeric, etc.). Additional details regarding tokenizing and coding are described in detail with reference to process 230 of FIG. 2A.

The ATM interface 114 is configured to generate and provide one or more graphical user interfaces (GUIs) for presentation on a display screen of an ATM 110. That is, the provided GUIs can execute and/or be displayed on a display on the ATM 110. In some other embodiments, the GUIs can be provided within a web browser or a mobile application (e.g., client application 142). As mentioned above, the GUIs may be provided as one or more interactable user interfaces. In another embodiment, the GUIs are generated and transmitted to the mobile application 142 for accessing by the user. In this regard and in some embodiments, the ATM may be "headless" where it does not include a display device. In these embodiments, the ATM 110 may be paired with the user device 142, whereby the user device 140 and particularly client application 142 provides (and, in some embodiments, generates) GUIs that enable the user to interact and control the ATM. The pairing may be based on the user tapping their user device to the ATM 110, which launches the mobile application 142, which prompts the user for a credential (e.g., PIN, etc.), which is then transmitted to the ATM 110, which is transmitted to the provider computing system 170, and is subsequently authenticated by the system 170. In response, the user, via the mobile application 142, is provided with a control interface to control the ATM and perform transactions (e.g., withdrawals, etc.). Thus, the ATM interface 114 can include and/or generate one or more GUIs on a display of ATM 110. Additional details relating to the ATM interface are described in detail with reference to FIGS. 3A-3E, 4A-4D, FIGS. 5A-5C.

The input/output circuit 116 and network circuit 118 are configured to interact with a customer and a merchant to receive merchant vouchers and product inventory data, respectively. For example, network circuit 118 may receive information for products and services from a merchant. In the following example, similar to syncing described above with reference to the ledger, the network circuit 118 can sync merchant inventory data with the merchant dataset 124 such that it can be updated and maintained in real-time (or near real-time). The information may include information regarding products/services provided by one or more merchants and, therefore, include, but is not limited to, one or more photographs of items the merchant desires to sell and/or other product information (e.g., descriptions, warranties, sale price, discount price, etc.) and one or more videos and/or photographs of the service the merchant desires to provide and/or other service information (e.g., descriptions, upgrades, appointment times, sale price, discount price, etc.). In some arrangements, the received product inventory can be stored in the merchant dataset 124, and in particular, the product inventory (e.g., amounts of inventory, current price, discounts, specials, etc.) may be stored and updated in real-time (or near real-time) as product inventory data in merchant dataset 124. For example, the network circuit 118 and merchant computing system 150 can exchange data utilizing an API in real or near real-time and/or at predefined time intervals over network 130. In various arrangements, each merchant computing system 150 may have a unique API specific to the product inventory they sell (e.g., department store, food truck, gym, football game), such that the network circuit 118 can communicate using a unique API to access product inventory data. In some arrangements, the network circuit 118 can receive product inventory from merchants in real-time via the network 130 without requesting or accessing the merchant computing system 150. For example, the ATM 110 may broadcast the IP address or network address of the ATM 110 such that the merchant computing system 150 can send product inventory data to the broadcasted address. It should be appreciated that the merchant computing system 150 and ATM 110 can communicate and sync product inventory over network 130 utilizing one or more communication protocols and/or APIs that could be unique to the ATM 110 and/or merchant computing system 150.

As alluded to above and in one embodiment, the input/output circuit 116 and/or network circuit 118 may receive a merchant voucher and, particularly a deactivated merchant voucher, from a user device of a customer (e.g., in digital form) or from a customer (e.g., in physical form). As described above, the merchant voucher may include, but is not limited to, an identified product(s) and/or service(s) for purchase, a price of the identified product and/or service for purchase, an expiration of the voucher, a merchant identifier (e.g., a merchant category code or other identifier), a bar code or other scannable code, and/or other information regarding the merchant and/or product/service for purchase. In some arrangements, the merchant voucher can be digital (e.g., stored in mobile client application 142, etc.) and transmitted to a user device 140 via a communication session with the ATM 110 (e.g., in particular network circuit 118). For example, the user device 140 may communicate via network 130, a radio frequency identification (RFID), Bluetooth® (BLE), near-field communication (NFC), and/or any other communication protocol with the merchant computing system 150 to receive a deactivated merchant voucher. The deactivated merchant voucher may be retrievably stored in the mobile user client application 142. Subsequently, the user device 140 may transmit the deactivated merchant voucher to the ATM 110 (e.g., via a NFC tap, Bluetooth® communication, over a LAN, etc.). In response and after receiving a deposit corresponding to the value of the merchant voucher, the ATM 110 (or, provider institution computing system 170 in some embodiments) can generate an activated merchant voucher (which may be at least one of a code or a token). The activated merchant voucher may be transmitted to the user device 140 via the communication session wirelessly. In various arrangements, the deactivated merchant voucher can be a physical voucher (e.g., paper, plastic, microchip, etc.) that can be scanned, tapped, swiped, and so on, by the input/output circuit 116 of ATM 110.

The input/output circuit 116 is configured to perform an authentication with the user device 140 based on exchanging a "handshake packet" between the ATM 110 and a nearby user device 140. A handshake or handshake packet is an automated process of communicating between two devices. In some embodiments, the handshake packet may be configured to use cellular connections, NFC, Bluetooth®, Wi-Fi, and the like, between the ATM 110 and the user device 140. For example, the user device 140 may be configured to send an deactivated merchant voucher and/or other information (e.g., specification in a metadata, a header, and/or a body of the handshake packet) to the input/output circuit 116. The input/output circuit 116 may be configured to receive the handshake packet from the device and provide the handshake packet to the voucher processing system 112. The voucher processing circuit 112 may receive the deactivated merchant voucher, analyze the voucher (e.g., decode, scan unzip), and identify the merchant and a value associated with the merchant voucher based on the analysis. Analyzing can include determining the information stored in the merchant voucher such as an identifier, value, merchant, and so on. The input/output circuit 116 may be configured to similarly send a handshake packet back to the user device 140, which may establish a data channel between the ATM 110 and the user device. In some examples, the input/output circuit 116 can detect user devices 140 from a nearby customer. Each data channel may include a network connection (e.g., wired, wireless, cloud) between the user devices and the systems (e.g., 110, 150, 170). In particular, a data channel can be between a source address (e.g., network address) and a destination address (e.g., network address) of processing circuits described herein. For example, a data channel can communicably couple at least two devices over network 130.

In some arrangements, the ATMs 110 can be communicably coupled to an ATM database 120. The ATM database 120 is structured as a repository (e.g., computer storage system such as one or more memory devices, etc.) that stores various data regarding interactions with the ATM (e.g., number of transactions that occurred at each ATM, number of deactivated merchant vouchers received, merchant and customer information associated with the received vouchers, etc.). In various arrangements, some of the data can be encrypted by an encryption operation utilizing a cryptographic function. For example, the cryptographic function could be a homomorphic encryption function. In other example, the cryptographic function could be any symmetric encryption function (e.g., Triple Data Encryption Standard (TDES), RC5, Advanced Encryption Standard (AES), Blowfish, CAST, and so on), and/or asymmetric encryption function (e.g. Rivest-Shamir-Adleman (RSA), Efficient and Compact Subgroup Trace Representation (ECSTR or XTR), Digital Secure, Escrowed Encryption Standard (EES), and so on).

As mentioned above, the ATM database 120 can be a database configured to store and/or maintain at least some of the information described herein. The ATM database 120 can maintain one or more data structures which can index voucher data (e.g., stored in voucher dataset 122), merchant data (e.g., merchant dataset 124), and user data (e.g., stored in user dataset 126). In one example, the ATM database 120 may store product inventory data in merchant dataset 124. In another example, activated merchant vouchers can be recorded in voucher dataset 122. In some arrangements, the activated merchant vouchers may have identifying information and a voucher state. In this regard, a deactivated merchant voucher (or "merchant voucher," or "untokenized merchant voucher") is a data structure that enables an ATM or provider computing system (described herein) to process and determine a value of the deactivated merchant voucher. As used herein, an "activated merchant voucher" (or "tokenized activated merchant voucher," "tokenized merchant voucher" "tokenized," "coded activated merchant voucher," "coded merchant voucher," "coded,") is a voucher issued by an ATM (e.g., after receiving a deposit or payment from a customer) that indicates a customer has made a deposit (e.g., paid for a product/service) that can be redeemed by a customer at a merchant (e.g., in-person, online, etc.). In this regard, an activated merchant voucher can be a token and/or a code, is indicative of a proof of payment, and enables redemption of purchased products and/or services. As used herein, a "redeemed merchant voucher" is a voucher that has been redeemed at the merchant and has no value. As used herein, an "expired merchant voucher" is a voucher that has been expired based on the expiration date and has no value. In this regard, a redeemed merchant voucher or expired merchant voucher that is a data structure that is associated with no value and unredeemable by a merchant computing system.

For example, an issued merchant voucher to a customer may be changed from a voucher state of "DEACTIVATED" (e.g., voucher state=DEACTIVATED) to a voucher state of "ACTIVATED" (e.g., voucher state=ACTIVATED). In another example, upon receiving an indication of a voucher redemption from a merchant computing system 150, the voucher processing system 112 can update the voucher state of the redeemed voucher in voucher dataset 122 (e.g., voucher state=REDEEMED). In yet another example, when an expiration date of a voucher is reached (e.g., expires after 3 hours from issuance, 1 day, 30 days, etc.), the voucher processing system 112 (or provider institution computing system 170 and/or merchant computing system 150 that maintains a ledger of the vouchers) can update the voucher state of the redeemed voucher in voucher dataset 122 (e.g., voucher state=EXPIRED). Furthermore, each merchant voucher can have a designate voucher type (or vouchertype) stored in voucher dataset 122. A voucher type can be, but is not limited to, zero-value voucher (e.g., provided by a merchant), marketplace voucher (e.g., provided by the ATM), and/or an online voucher (e.g., provided by an online website).

The ATM database 120 can be accessed using one or more memory addresses or index values. The ATM database 120 can be accessed by the components of the one or more processing circuits described herein (e.g., ATM 110, or any other system and/or devices described herein via the data acquisition engine 190) via the network 130. That is, the ATM database 120 may be in communication with one or more processing circuits of the ATM 110, merchant computing systems 150, and/or provider computing systems 180 via a private communication (sometimes referred to herein as a "secure connection"), in that one or more datasets (e.g., voucher dataset 122, merchant dataset 124) stored in the ATM database 120. In this regard and as described herein, the provider institution computing system 170 may maintain the database 120 in some embodiments.

It should be understood that ATM database 120 can exist external to the ATM 110 and may be accessed via a communication network (e.g., network 130). The ATM database 120 can be distributed across many different computer systems or storage elements and may be accessed via the communication network or a suitable computer bus interface. The one or more processing circuits of the ATM 110 can store, in the ATM database 120, the results of any or all computations, determinations, encryptions, decryptions, selections, identifications, generations, constructions, or calculations in one or more data structures indexed with appropriate values, each of which may be accessed by the one or more processing circuits of the ATM 110 to perform any of the functionalities or functions described herein. In various arrangements, the ATM database 120 includes various transitory and/or non-transitory storage mediums. The storage mediums may include but are not limited to magnetic storage, optical storage, flash storage, RAM, and so on. The one or more processing circuits can use various APIs to perform database functions (e.g., managing data stored in the ATM database 120). The APIs can be but are not limited to SQL, NoSQL, NewSQL, ODBC, JDBC, and so on.

The merchant dataset 124 is a dataset regarding/including merchant information and customer information linked to merchant information. Accordingly, the merchant dataset 124 may include personal information of customers (e.g., names, addresses, phone numbers, identifier, and so on), authentication information of customers (e.g., username/password combinations, device authentication tokens, security question answers, unique client identifiers, biometric data, geographic data, social media data, and so on), financial information of customers at the merchant (e.g., token information, account numbers, account balances, available credit, credit history, exchange histories, voucher history, and so on), inventory/product information of the merchant (e.g., description of products and/or services, price, available inventory, location, etc.), payment preferences of the customer at the merchant (e.g., preferred payment method, auto-payment, auto-escrow, bank account number, routing number, payment card industry (PCI) data, and so on), and so on. The user dataset 126 can include similar features as the merchant dataset 124 but is information relating to the users that is not specific to the merchant. For example, the user dataset 126 can include additional information regarding accounts held by the user not tied to a specific merchant, information regarding the accounts such as balances and limits, and so on. Accordingly, the user dataset 126 can include personal information of the users, authentication information of the users, financial information of the users, and payment information of the users.

Figure 2A:
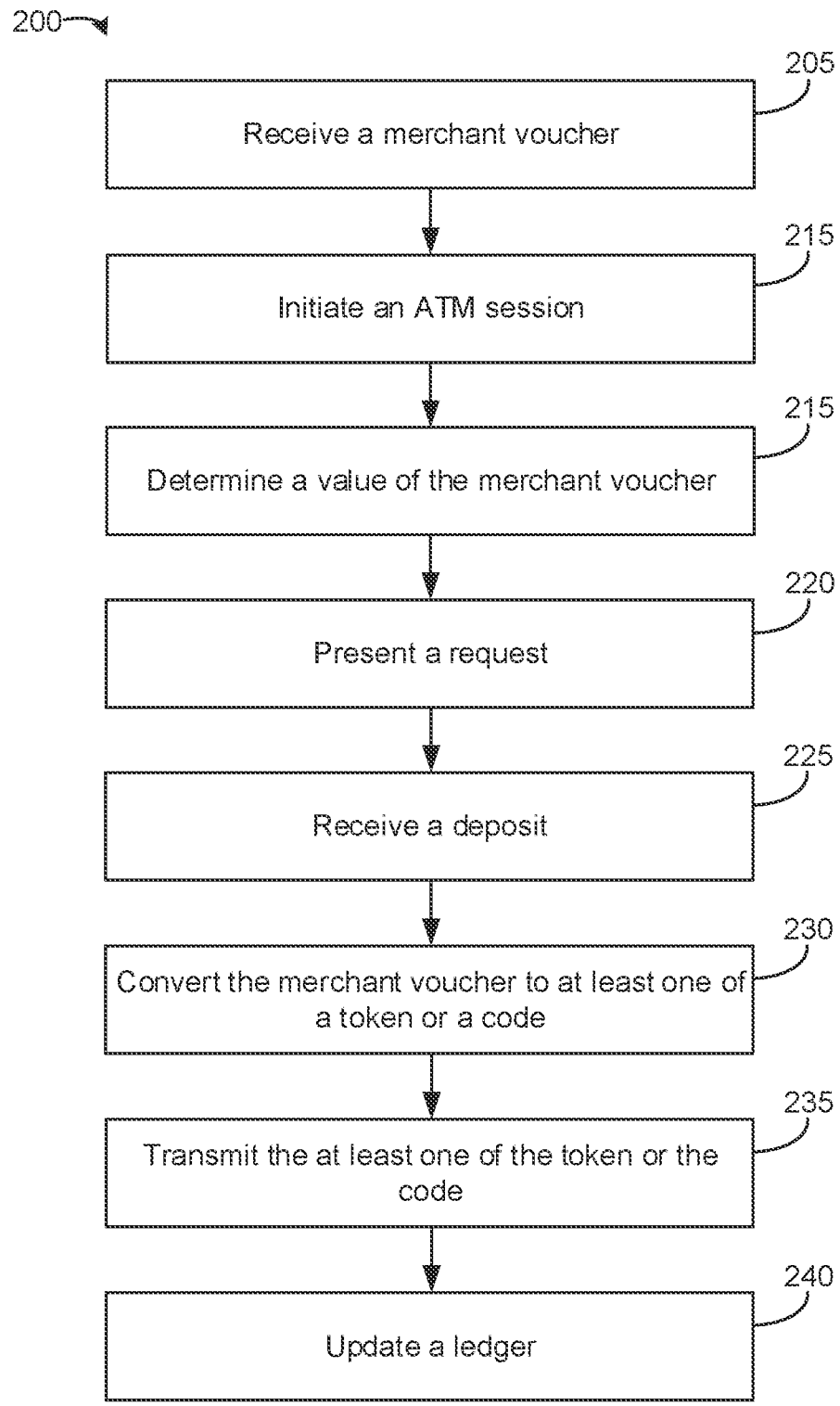
FIG. 2A is a flowchart for a method of replenishing an ATM via a merchant transaction that may be implemented or performed by one or more components of FIG. 1, according to some arrangements.

Referring now to FIG. 2A, a flowchart for a method 200 of replenishing an ATM via a merchant transaction that may be implemented or performed by one or more components of FIG. 1 is shown, according to one embodiment. ATM 110 can be configured to perform method 200. As an overview of method 200, at process 205, the ATM 110 receives a deactivated merchant voucher. At process 210, the ATM 110 initiates an ATM session. At process 215, the ATM 110 determines a value of the deactivated merchant voucher. At process 220, the ATM presents a request regarding the determined value of the deactivated merchant voucher. At process 225, the ATM receives a deposit. At process 230, the ATM 110 converts the merchant voucher to at least one of a code or a token. At process 235, the ATM 110 transmits the at least one of the token or the code to the user device. At process 240, the ATM 110 updates a ledger. Additional, fewer, and/or different operations may be performed depending on the particular arrangement. In various arrangements, each operation may be re-ordered, added, removed, or repeated. In some arrangements, the provider computing system 170 can also perform and/or perform tasks/processes in parallel with ATM 110 to perform process 220, process 230, and process 235, and process 240.

Prior to process 205, the merchant computing system 150 and/or provider institution computing system 170 may generate one or more deactivated merchant vouchers. In one embodiment, the merchant voucher is generated in response to a user request. For example, the user may be at a merchant and desire a particular product. The user informs the merchant, who then causes the dynamic generation of a deactivated merchant voucher, which may be in a digital or a physical form. Alternatively, the user device 140 may scan a code associated with the product desired for purchase. The code may cause a launching of the mobile application 142. The mobile application 142 may then prompt the user if he/she would like to pay cash for the product scanned. If an input is received by the mobile device 142 indicating yes, the mobile application 142 may generate a deactivated merchant voucher, which may include the information described herein (e.g., product identifier, merchant identifier, price of product which may be the same as the value of the voucher, etc.). This deactivated merchant voucher may then be stored by the user device 140 for retrieval and providing to the ATM. In this configuration, the deactivated merchant voucher is generated by the mobile application 142. In other configurations, the mobile application 142, via the mobile device 140, may provide a notification to the merchant computing system 150 and/or provider institution computing system 170 to generate the deactivated merchant voucher, which is then provided electronically the mobile application 142. This latter embodiment may be desired to avoid using physical vouchers and keeping the transaction process completely digital. Further, the digital process may enable records/entries to be transmitted to the provider institution computing system 170 in real-time to track the process.

Based on the foregoing, at process 205, the ATM 110 receives, via a communication session from a user device, a merchant voucher distributed by a merchant as described above. In this embodiment, the merchant voucher is a digital voucher. The communication session can be established over network 130. In various arrangements, the processing circuit (of ATM 110 or user device 140) can establish, utilizing an application programming interface (API), the communication session such that the processing circuit of the ATM and the user device 140 exchange information via an API. The communication session refers to a wireless connection between the ATM 110 and the user device to enable the exchange of information as part of a transaction (e.g., for a product provided by a nearby merchant) and, can include, but is not limited to, a near-field communication (NFC), Wi-Fi, Bluetooth®, mobile communication, satellite communication, etc.), etc. In an alternate embodiment, the communication session may be a wired session (e.g., via a cable, ethernet, phone-specific cable, etc.).

In another embodiment, the merchant voucher may be a physical voucher. In this embodiment, the merchant voucher can be received as a scanned, fed, or tapped voucher (e.g., physical) from a scanner, reader, or feeder of I/O circuit 116 from the user. For example, the merchant voucher can be received via a feeder, subsequently scanned and discarded in a bin of the ATM 110. That is, the merchant may desire to remove the merchant voucher from circulation and thus the ATM 110 can store the deactivated merchant voucher in a storage of the ATM 110. In various arrangements, the merchant voucher can received by user input on a display interface (e.g., I/O circuit 116).

Furthermore and as described above, each merchant voucher can have a voucher state and a voucher type. In some arrangements, a voucher state can be, but is not limited to, deactivated, activated, redeemed, and expired. For example, the voucher state of a received merchant voucher in process 205 may be deactivated. In various arrangements, a voucher type can be, but is not limited, zero-value voucher, marketplace voucher, and online voucher. For example, the voucher type of a receive merchant voucher in process 205 may be a zero-value voucher. In particular, the zero-value voucher indicates a merchant generated a voucher without a value.

At process 210, the ATM 110, in response to receiving the merchant voucher, initiates an ATM session. As an example, an ATM 110 can be in an idle state waiting for interactions from a customer of the ATM 110. Upon receiving an interaction from a customer (e.g., merchant voucher received via a communication session, and/or another interaction), the processing circuit (as described in detail with reference to FIG. 6) of the ATM 110 can initiate an ATM session with a customer. In various arrangements, an ATM session can be initiated without receiving a user interactions other than receiving a merchant voucher. In some arrangements, the ATM session can be initiated upon receiving another interaction from the user such as a touch of the display interface or selection of a button on the ATM 110. In another embodiment, the ATM session can be initiated by the user (e.g., insertion of a debit card or tap of user device) followed by the ATM 110 receiving the deactivated merchant voucher.

At process 215, the ATM 110 determines a value (or price) of the merchant voucher. The value generally refers to the price/cost for the desired merchant product and/or service (e.g., the price of the product plus any applicable fees). In one embodiment, the merchant voucher can be encoded with the value. For example, when the user device 140 scans a code associated with the product, the value of the product may be used by the mobile application 142 to generate the deactivated merchant voucher. In another example, the ATM 110 can communicate (e.g., over network 130) with the merchant computing system 150 for determining a value of the deactivated voucher. In which case, the value may not be encoded in the voucher. When the value is not encoded in the deactivated merchant voucher, the processing circuit of the ATM 110 can identify the merchant based on one or more identifying information associated with the merchant voucher. In some arrangements, the processing circuit of the ATM 110 can cross-reference the merchant dataset 124 to determine the value of the merchant voucher associated with one or more merchants. In particular, product inventory data may be received and stored in merchant dataset 124 for a plurality of merchants such that the value of the merchant voucher can be determined. For example, the merchant voucher may include (or be linked to) the goods and/or services being purchased and the merchant dataset 124 may have real-time (or near real-time) product inventory data for the merchant to determine the value of the merchant voucher. For example, the merchant voucher can have a unique serial number or order number correlated to one or more entries in a database (e.g., 124) to determine the value.

In some arrangements, the value of the merchant voucher can dynamically change, such as based on the time of day, week, inventory, other factors, etc. For example, if inventory is low for a good (e.g., last 5) the value may increase for that good. When the value is embedded in the deactivated merchant voucher (e.g., where it is an electronically stored in the mobile application 142), the merchant computing system 150 may send a periodic update to vouchers associated with that product to mobile devices storing those vouchers to change the stored value.

As another example, the value may be embedded or not embedded in the voucher but upon receipt of it by the ATM 110, the ATM 110 directly may transmit a message to a merchant computing system 150 to determine if any updates to the value have occurred in order to, in response, determine an updated value of the voucher which may be different from the previously embedded stored value. Various factors may affect the value of the voucher. For example, during a holiday, the value for a service (e.g., airplane travel) may increase. In yet another example, during peak hours of the day for a restaurant (e.g., hours during the most sales) the price of food may increase and during low hours of the day for a restaurant the price of food may decrease (e.g., to encourage purchases). Accordingly, the merchant voucher value can dynamically change based one or more factors.

At process 220, the ATM 110 generates presents, via a display interface of the ATM 110, a request for the determined value. The request can be a deposit request for physical currency (e.g., cash) of the determined value of the deactivated merchant voucher. In some arrangements, the presentation of a request can be based on a continuous active communication session where the user device 140 is within a threshold distance of the ATM such that the communication protocol connection (e.g., Bluetooth®, Wi-Fi, NFC, etc.) remains active. In various arrangements, the ATM 110 can authenticate the user by requesting identifying information (e.g., username, password, address, etc.), security questions, two-factor authentication, and so on associated with an account of the user.

At process 225, the ATM 110 receives a deposit regarding the determined value of the merchant voucher based on the prompt. In some arrangements, the processing circuit of the ATM 110 can receive a deposit via an I/O circuit 116 (e.g., bill feeder of dispenser and intake 304) of physical currency.

According to an alternate embodiment, the deposit can be electronic, such as being received via a mobile wallet or electronic payment from the user device 140 (e.g., mobile wallet), the provider computing system (e.g., bank transfer), or a data source 160 (e.g., process chain ledger). For example, the mobile wallet of the user device 140 can provide an electronic payment via a card network, banking network, or blockchain network, to the ATM 110.

The ATM 110 receives the physical currency and analyzes the currency to determine that the physical currency matches or exceeds the determined value. Thus, the ATM 110 may include a physical counting machine that is configured to count the physical currency. Further, the ATM 110 may determine exchange rates for various currencies, if needed as well. If the deposited physical currency meets or exceeds the determined value, the method progresses to process 235. In the event there is an overage, the ATM 110 may provide a refund to the customer (e.g., electronically such as a stored value card pushed to their mobile application 142) or physically (e.g., a refund of physical currency).

At process 230, the ATM 110 converts the merchant voucher to at least one of a token or a code based on the received deposit matching or exceeding the determined value (i.e., an activated merchant voucher). The at least one of the token or the code may be embedded with an indicator regarding the determined value, information regarding the merchant voucher, and a unique identifier. Thus, the ATM 110 uses the merchant voucher information to generate a code or token. In another embodiment, the provider institution computing system 170 may receive an approval from the ATM 110 to generate the code or token and, in turn, generate the code or token. The provider institution computing system 170 may then provide the generated code or token to the ATM 110 for providing to the user (e.g., user device 140). In yet another embodiment, the merchant computing system 150 may generate the token and/or code.

The generated code and/or token represents a construct/structure that may be used by the user to obtain the desired product(s) or service(s) from the merchant that were associated with the deactivated merchant voucher. The code or token may be embedded with an indicator signifying that the deposit for certain products or services has been received and is confirmed, information regarding the merchant voucher, and a unique identifier. In particular, the embedded indicator can provide a proof of payment for the products or services associated with the merchant voucher.

In some embodiments, the customer of a merchant may be unsure about what to buy. In the following embodiments, the merchant could issue a generic merchant voucher (e.g., deactivated merchant voucher) that is not limited to certain products or services associated with the merchant. Accordingly, the customer, at ATM 110, could deposit physical currency associated with a generic merchant voucher and receive a code or token for the deposited currency such that the customer could use it at the merchant and not be limited to specific products and/or services.

In some embodiments, the code and/or token could be used for more than one transaction and could be reloaded by depositing additional currency in ATM 110 (or a different ATM 110). It should be understood, that a generic merchant voucher can be deactivated upon issuance by a merchant and can be activated by the ATM 110 (e.g., embedded with an indicator) for redemption at the merchant.

The token and/or code may include embedded data (e.g., as metadata in one or more fields of the code and/or token). For example, the determined value (e.g., $50, $99.24, etc.), information regarding the merchant voucher (e.g., voucher state, voucher type, expiration date, etc.), and unique identifier (e.g., randomly generated) may be inserted into a field of the token or code data structure. In some arrangements, prior to inserting the information into the token or code data structure, the information can be encrypted using a private key of a public and private key pair of the ATM 110. In various arrangements, the public key of the public and private key pair can be shared on network 130 (e.g., with merchant computing system 150).

The code may be a QR code, bar code, universal product code (UPC), international article number (EAN), a randomized pixel configuration, data matric, etc. The token may be a data payload that is transmitted via a short-range wireless communication (e.g., via NFC, Bluetooth®, and/or other short-range wireless communication signals). The token or code can be used by the merchant computing system 150 to redeem the value deposited by the customer at ATM 110.

In some arrangements, the token or code can include obscured sensitive information, such as account number, order number, login credentials, financial institution identifier, and other authorization information regarding the user and/or merchant. The token can be subsequently used by the merchant computing system (e.g., I/O circuit 152) during redemption to verify that the voucher has been funded by the customer for the requested/purchased goods and/or services. Accordingly, the token or code may embed any information that may be used by the merchant computing system 150 to uniquely identify the transaction, i.e., such that the merchant computing system can process the transaction and receive funds from ATM 110 (or provider computing system 170) once the token or code is received by merchant computing system from user device 140 or physical redemption. Furthermore and in some embodiments, the token or code, for example, may be devoid of information that identifies an account number of the customer (i.e., may be completely of any portion of an account number of the customer). In some arrangements, the information embedded in the token or code may be used to facilitate collection of funds from the ATM 110. For example, in some embodiments, the token or code may embed a determined value, merchant voucher information, and a unique identifier that the ATM 110 or provider computing system 180 can cross-reference in the ledger upon redemption occurring (or when redemption occurs).

At process 235, the ATM 110 transmits, via the communication session to the user device, the at least one of the token or the code. For example, the token or code can be provided by the user device 140 using one or more communication protocols (e.g., a short-range wireless communication, such as NFC or Bluetooth®, a LAN, etc.). In another example, the ATM 110 can send an email having a link to the code or token, or a text message containing or having a link to the code or token to the user device 140. Upon selection of the link or receiving the code/token via a tap or wireless communication with the ATM 110, the code and/or token may be stored by the user device within the user client application 142. In some arrangements, the processing circuit of the ATM 110 can also update the voucher state of the merchant voucher to the activated voucher state. Similar to the communication when receiving the merchant voucher in process 205, the customer can receive the token or code for use at the merchant computing system 150. In some alternative arrangements, the processing circuit can also or alternatively print and dispense the code that can include a scannable identifier for physical redemption by the user at the merchant. That is, the ATM 110 can include a printer including an output feed configured to print and dispense the code and the processing circuit can transmit, to the printer, a print request to print the code including the scannable identifier.

At process 240, the ATM 110 updates a ledger of the merchant held by the merchant computing system 150 in response to transmitting the at least one of the token or the code to the user device. In some arrangements, an ATM 110 and/or provider institution computing system 170 can store and maintain a ledger associated with a merchant in merchant dataset 124. The ledger may be a distributed ledger distributed across and ATM communication networks or a plurality of computing systems (e.g., where each computing on the network can have a copy of the ledger associated with deposits and withdrawals). In various arrangements, the ledger can be a blockchain ledger (e.g., where each block is a withdrawal or deposit). In some arrangements, the ledger can be a banking ledger that can include withdrawals and deposits associated with accounts and/or customers of ATM 110 and/or provider computing system 180. Ledgers can also include balances for accounts of customers and merchants and information associated with the accounts. In various arrangements, the provider computing system 180 can store and maintain the ledger in ledger dataset 186 and the processing circuit can communicate, via a secure connection (e.g., encrypted data and share public keys and/or private keys, security protocol), to update the ledger stored in provider institution computing system database 184. In some arrangements, the processing circuit can receive an indication of a voucher redemption associated with the at least one of the token or the code. In turn, the processing circuit and update the voucher state of the merchant voucher to the redeemed voucher state and release the escrowed deposit to an account of the merchant on the ledger. In various arrangements, the ledger can escrow the payment in an escrow account (e.g., on a ledger stored in ledger dataset 176) of the provider computing system 170 or ATM 110 until the voucher is redeemed, and at that time, the funds may be transferred into the merchants accounts on a ledger of ledger dataset 176. As shown, the described method 200 provides an ATM 110 with improved uptime and security since they can replenish themselves. In particular, instead of individuals of merchants and/or third-parties replenishing ATM 110 when they are low or out of currency, the ATM 110 can provide a user friendly experience and merchant friendly alternative to using physical currency while allowing ATMs 110 to reduce downtime and reduce vulnerabilities associated with replenishing ATMs 110.

Figure 2B:
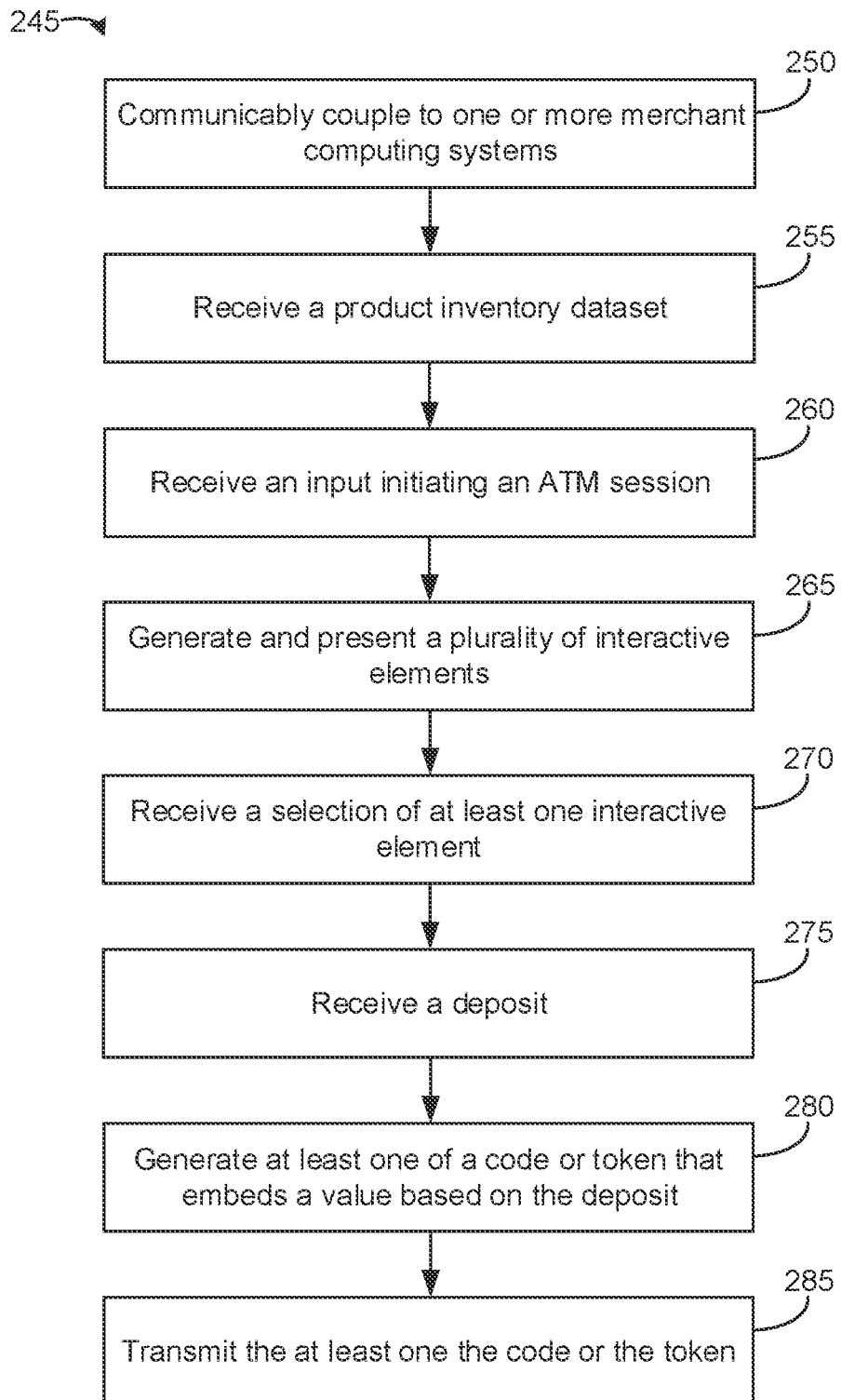
FIG. 2B is another flowchart for a method of replenishing an ATM via a transaction at the ATM that may be implemented or performed by one or more components of FIG. 1, according to some arrangements.

Referring now to FIG. 2B, a flowchart for a method 245 of replenishing an ATM 110 via a transaction at the ATM 110 is shown, according to one embodiment. ATM 110 can be configured to perform method 245. In an overview of method 245, at process 250, the ATM 110 (e.g., ATM 110 in FIG. 1) communicably couples to one or more merchant computing systems 150. At process 255, the ATM 110 receives a product inventory dataset. At process 260, the ATM 110 receives an input initiating an ATM session. At process 265, the ATM 110 generates and present a plurality of interactive elements. At process 270, the ATM 110 receives a selection of at least one interactive element. At process 275, the ATM 110 receives a deposit. At process 280, the ATM 110 generates a code and/or token that embeds a value associated with the deposit. At process 285, the ATM 110 transmits the code and/or token to the user device. Additional, fewer, or different operations may be performed depending on the particular arrangement. In various arrangements, each operation may be re-ordered, added, removed, or repeated. Method 245 includes similar features and functionality as described with reference to method 200. In some arrangements, the provider computing system 170 can also perform and/or perform certain tasks in parallel with ATM 110 to perform process 265, process 280, and process 285.

Referring to method 245 in more detail, at process 250, the ATM 110 communicably couples to one or more merchant computing systems associated with one or more merchants. In some arrangements, the coupling can occur over a wired and/or wireless network (e.g., network 130). The coupling may be a secure connection such that data is encrypted prior to transferring it between the one or more merchant computing systems and processing circuit of the ATM 110. In various arrangements, the processing circuit can establish, utilizing a first application programming interface (API), a first communication session between the one or more merchant computing systems and the at least one processing circuit, wherein the at least one processing circuit and the one or more merchant computing systems exchange information via the first API.

At process 255, the ATM 110 receives a product inventory dataset associated with one or more merchants from the one or more merchant computing systems. Each merchant, via their associated merchant computing system 150, can provide product inventory data associated with one or more products and/or services they provide/offer for sale. The ATM 110 can be associated with a geographic coordinate(s) and a plurality of merchant computing systems 150 can also be associated with a geographic coordinate. For example, the ATM 110 may receive product inventory via network 130 from merchant computing systems 150 within given geographical radius (e.g., 1 mile from ATM 110, 5 miles from ATM 110). In this regard and beneficially, the ATM 110 may only store merchant data that is specific to nearby merchants and not all the merchants anywhere. This arrangement beneficially decreases memory requirements of the ATM 110. In another example, the ATM 110 may also or alternatively receive product inventory via network 130 from merchant computing systems 150 subscribed to the ATM 110 (e.g., the merchant may enroll with the provider institution computing system 170 that maintains the ATM 110 in order to push their product inventory to the ATM(s) nearby there locations). In yet another example, the ATM 110 may also or alternatively receive product inventory via network 130 from provider computing system 170. In yet another example, the ATM 110 may also or alternatively receive product inventory via network 130 from data sources 160. In some arrangements, a plurality of ATMs 110 can be associated with an ATM communication network such that they can sync transactions and product inventory across ATMs 110.

In some arrangements, the ATM 110 can monitor (e.g., sync in real-time or near real-time, query merchant database 154, query data sources 160, receive periodic updates from merchant computing system 150, or combination of various monitoring implementations, and so on) a product inventory of the merchant (e.g., accessing their website, or accessing merchant database 154). The product inventory data can include, but is not limited to, information such as one or more photographs of items the merchant desires to sell and/or other product information (e.g., descriptions, warranties, sale price, discount price, etc.), one or more videos and/or photographs of the service the merchant desires to provide and/or other service information (e.g., descriptions, upgrades, appointment times, sale price, discount price, etc.). In some arrangements, the processing circuit of the ATM 110 can update the product inventory dataset, which can include updating an amount of inventory associated with each product of the plurality of products. In various arrangements, monitoring can include monitoring, via the first API in real-time or near real-time, product inventory of the plurality of products and in response to identifying an update in the product inventory, update, in real-time or near real-time, the product inventory dataset.

At processes 260 and 265, the ATM 110 receives, via a display interface of the ATM 110, an input initiating an ATM session and generates and presents, via the display interface of the ATM 110, a graphical user interface including a plurality of interactive elements associated with a plurality of products of the product inventory dataset included with the merchant dataset 124. In another embodiment, the ATM 110 can receive information for the GUI from the merchant computing system 150 and then update a GUI format (e.g., product inventory associated with the nearby merchant, etc.). Receiving an input can include receiving a touch of the display interface. In some arrangements, the input can be received from any I/O circuit 116 of the ATM 110.

The GUI may include a plurality of interactive elements associated with a merchant nearby the ATM 110 (i.e., a merchant marketplace of goods and/or services). In some arrangements, the presented GUI, via the ATM 110, can be generated and configured by the ATM interface 114 based on the one or more libraries or one or more frameworks (e.g., look and feel). As described with reference to FIG. 1, the merchant computing system 150 and the ATM 110 can establish a secure connection. That is, the provided GUIs can execute and/or be displayed at the display interface (e.g., I/O circuit 116) of ATM 110. In various arrangements, the processing circuit (e.g., ATM interface 114) can utilize the received product inventory data of one or more merchants and provide a display of the plurality of goods and services based on the information in the product inventory data. The GUI may include marketplace items such as one or more photographs of items of the product inventory dataset (e.g., stored in merchant dataset 124) and/or other item information (e.g., descriptions, warranties, sale price, discount price). The ATM 110 may include instructions (e.g., scripts, executable code, etc.) that when interpreted by the processing circuit cause one or more GUIs to present on the display interface described herein. As mentioned above, the GUIs may be provided as one or more an interactable web pages. In another embodiment, the GUIs are generated and packaged into a mobile application accessible to a user (e.g., marketplace interface). Thus, processing circuit can include one or more application interfaces for presenting an application (e.g., mobile application, web-based application, virtual reality/augmented reality application, smart TV application, and so on). In some arrangements, the GUI may be provided to a user device 110 (e.g., if ATM 110 does not include a display), and the user device 110 can perform similar functionality as described herein with reference to ATM 110.

In some arrangements, generating and presenting, via the display interface of the ATM 110, can include presenting a plurality of merchants associated with the product inventory dataset, wherein the selection includes at least two products of the plurality of products, and wherein the at least two products are associated with at least two merchants. Furthermore, the code and/or token may include a first code and/or token for a first product of the at least two products and a second code and/or token (e.g., different than the first code and/or token) for a second product of the at least two products.

At process 270, the ATM 110 receives, via the display interface, a selection of at least one interactive element of the plurality of interactive elements regarding at least one product or service of the plurality of products and/or services. Upon selection of one or the interactive elements by a user, the interactive element can be expanded and can include a price, one or more modifications (e.g., food modification, service modifications, goods modification, size modification), and/or one or more customizations (e.g., custom engravings, custom size).

At process 275, the ATM 110 receives a deposit for a value regarding the selection. Receiving a deposit is described in detail with reference to process 225.

At process 280, the ATM 110 generates a code and/or token (e.g., an activated merchant voucher) that embeds a value associated with the deposit and a unique identifier. Receiving a deposit is described in detail with reference to process 230. Instead of converting the merchant voucher, at process 280 the processing circuit can generate a code (and/or token) and embed values associated with the deposit (e.g., $50, $150, 1 cryptocurrency, 1 coupon, etc.) and a unique identifier (e.g., randomly generated). Alternatively, the provider computing system 170 can generate a code or token and provide the generated coded or tokenized merchant voucher to the user device 140 (e.g., via network 130 or via ATM 110)

At process 285, the ATM 110 transmits, to a user device, the code and/or token for a transaction regarding the at least one product of the plurality of products. Transmitting the code (and/or token) is described in detail with reference to process 225.

Figure 2C:
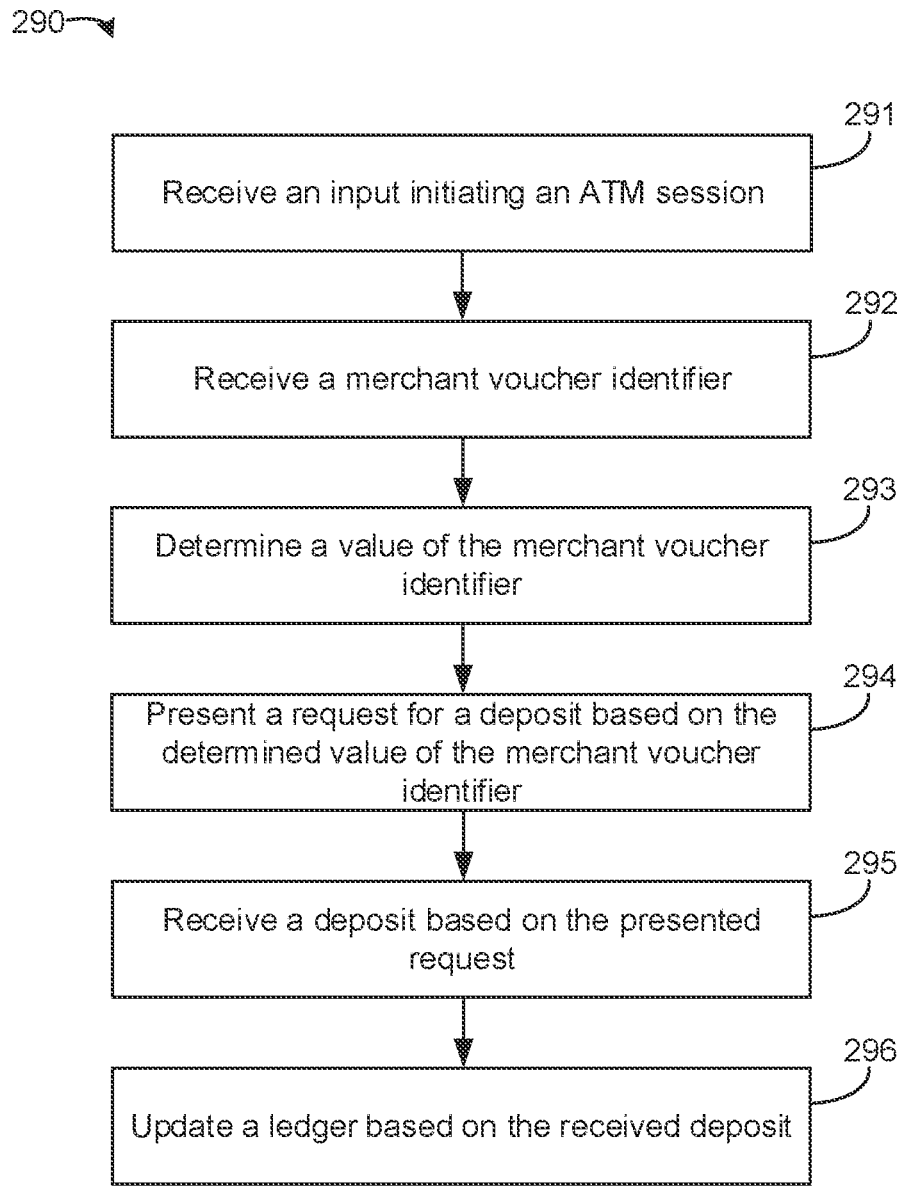
FIG. 2C is another flowchart for a method of online order processing utilizing an ATM that may be implemented or performed by one or more components of FIG. 1, according to some arrangements.

Referring now to FIG. 2C, a flowchart for a method 290 of online order processing utilizing automated teller machines is shown, according to some arrangements. Instead of receiving a merchant voucher or selecting goods and/or services from a merchant marketplace, the customer can provide a merchant voucher identifier received from an online order. ATM 110 can be configured to perform method 290, at least portions thereof. In an overview of method 290, at process 291, the ATM 110 receives an input initiating an ATM session. At process 292, the ATM 110 receives a merchant voucher identifier. At process 293, the ATM 110 determines a value of the merchant voucher identifier. At process 294, the ATM 110 presents a request for the determined value. At process 295, the ATM 110 receives a deposit based on the determined value. At process 296, the ATM 110 updates a ledger. Additional, fewer, or different operations may be performed depending on the particular arrangement. In various arrangements, each operation may be re-ordered, added, removed, or repeated. In some arrangements, the provider computing system 170 can also perform and perform tasks in parallel with ATM 110 to perform process 292, process 293, process 295, and process 296.

Method 290 includes similar features as described with reference to methods 200 and 245. In method 290, however, if the customer desires to make a physical currency (e.g., cash) purchase with an online order, the merchant can generate a merchant voucher identifier and the user can provide the merchant voucher identifier to the ATM 110. The processing circuit of the ATM 110 can cross-reference a merchant dataset 124 or communicate over network 130 with merchant computing system 150 to determine a value associated with the merchant voucher identifier. In some arrangements, the merchant computing system 150 can generate a unique identifier associated with an order and the ATM 110 (upon receival) can cross-reference a merchant dataset 124 and/or communicate with the merchant computing system to determine a value associated with the online order.

In general, a customer may select a product or service from an online marketplace and desire to pay with physical currency. In some arrangements, the online marketplace (e.g., provided by merchant computing system 150 or another host) can issue a deactivated merchant voucher associated with an identifier such that it can be redeemed at an ATM 110 of interest/desired by the customer. In this configuration, issuance of the deactivated merchant voucher can occur via a communication protocol such as, but not limited to, email, printed, text message, a push to mobile client application (e.g., 142), etc. As an example, a user may be online shopping and add one or more items to a cart. At checkout, the merchant system 150 may prompt the user for a payment method whereby the user indicates physical currency (e.g., cash). In which case, the merchant system 150 may prompt for information regarding the user (e.g., phone number, email address, etc.) and, using the information regarding the user, send a deactivated voucher to the user electronically. Subsequently, the user may provide the deactivated voucher to an ATM 110 and make a deposit to initiate the redemption of the desired products and/or services. Because the user is likely to be geographically distant from ATMs and even the brick and mortar merchant associated with the desired product(s) and/or service(s), the online marketplace may provide a list or map of the local ATMs that can used to activate the merchant voucher. For example, the processing circuit of the online marketplace may determine a list of the five closest ATMs from the geographic location of user device 140 or IP address used on the online marketplace.

Referring to method 290 in more detail, at process 291, the ATM 110 can receive, via the display interface of the ATM 110, an input initiating an ATM session. At process 292, the ATM 110 can receive, via a communication session from a user device, a merchant voucher distributed by a merchant. At process 293, the ATM 110 can determine a value of the merchant voucher identifier based on cross-referencing the merchant voucher identifier and a merchant dataset. At process 294, the ATM 110 can present, via the display interface of the ATM 110, a request for the determined value. At process 295, the ATM 110 can receive a deposit for the value of the merchant voucher. At process 296, the ATM 110 can update a ledger of the merchant.

In various arrangements, the merchant computing system 150 can determine nearby ATMs (e.g., based on the customers address or other identifying information) and provide at least one ATM 110 geographically proximate to the customer that can provide payment (or a deposit) to. For example, the geographic location of user device 140 can be used to determine all or nearly all of the ATMs 110 for deposit within a geographic area (e.g., one square mile area around the geographic location). In various arrangements, the merchant voucher identifier can also uniquely identify the merchant that issued the voucher (e.g., via a unique merchant identifier).

Referring now to FIGS. 3A-3E, 4A-4D, and 5A-5C, example illustrations of an ATM interface 326 (e.g., ATM interface 114) and ATM 310 are depicted, according to some arrangements. The ATM 310 may be the same or similar to the ATM 110 described herein. The ATM interface 326 enables a customer (also referred to herein as a "user") to present vouchers, select products/services, retrieve vouchers, and so on. For example, a customer may present an deactivated merchant voucher (e.g., digital or physical) generated by a merchant computing system 150 and provided to a customer. In another example, a customer may attempt to retrieve a voucher associated with a merchant (e.g., from an online order). In yet another example, a customer may desire to select one or more products and/or services associated with one or more merchants to purchase.

Figure 3A:
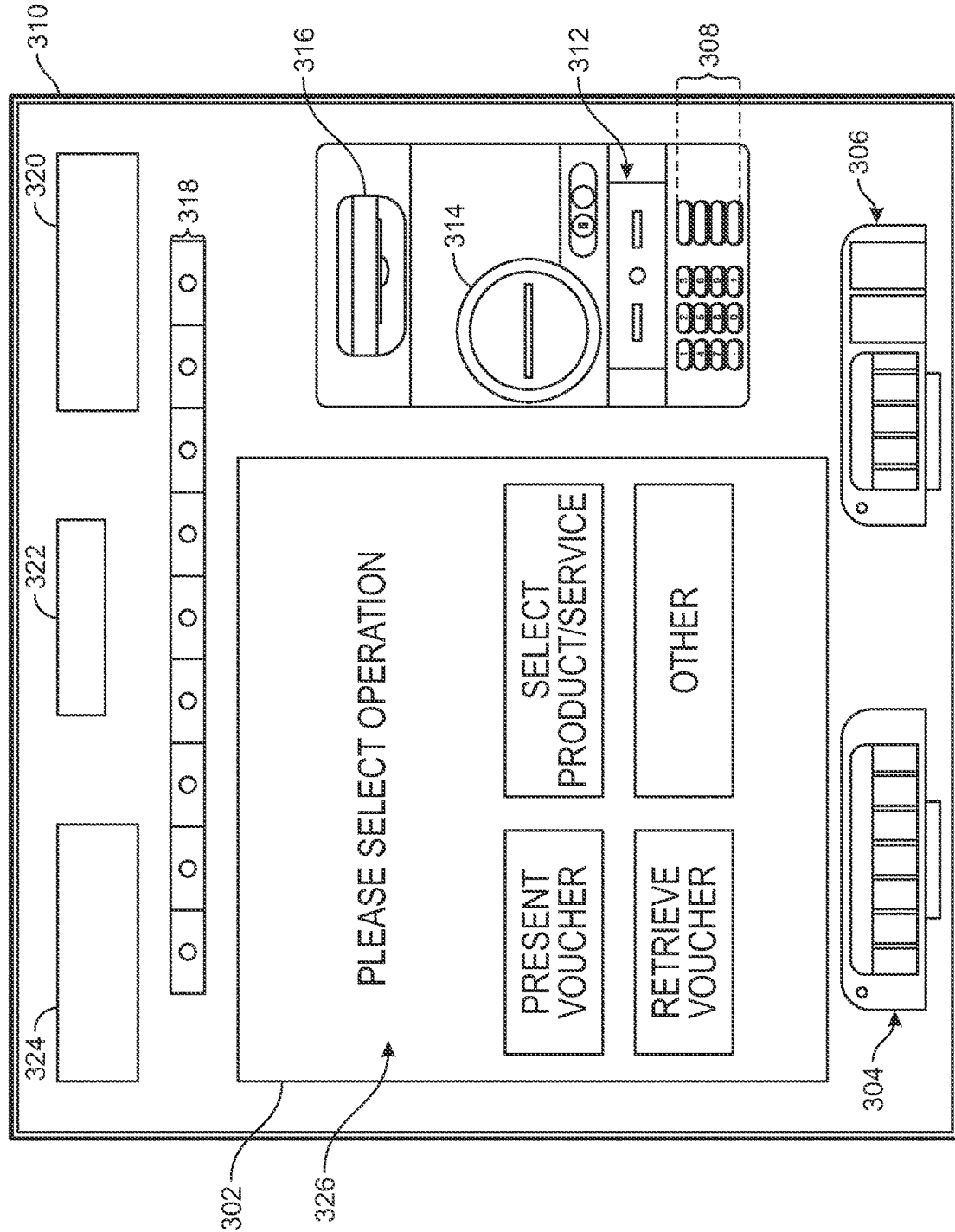
FIGS. 3A-3E are example graphical user interfaces that may be presented on the ATM of FIG. 1, according to some arrangements.

Referring to FIGS. 3A-3E in more detail, FIG. 3A illustrates an ATM 310 with a plurality of I/O devices (e.g., 302, 304, 306, 308, 312, 314, 316, 318, 320, 322, 324) implemented by an I/O circuit (e.g., 117) and an ATM interface 326. Display 302 (e.g., touchscreen) can be configured to present ATM interface 326. As shown, the ATM interface 326 can include a plurality of interactive elements. Interactive elements (e.g., input fields, scroll elements, selectable icons, etc.) can include, but are not limited to, text input, buttons, icons, images, switch, drop-downs, speech-to-text, and so on. Furthermore, various interactive elements are contemplated in this disclosure. For example, a user may select (e.g., via a touchscreen of display 302) an operation to perform. Additional details and features are described above with reference to method 200 of FIG. 2A.

Referring to the I/O devices, dispenser and intake 304 can be configured to dispense cash and receive cash, coins, other physical currency, and vouchers. Printer 306 can be configured to print and dispense vouchers, receipts, and so on. Keyboard 308 can be configured to receive user input (e.g., user PIN, user credentials, dispense command, deposit command, etc.). Microphone, speaker, camera input 312 can be configured to receive audio data and convert audio input into an electrical signal. Furthermore, microphone, speaker, camera input 312 can be configured to output audio to a customer. Moreover, microphone, speaker, camera input can be configured to scan or capture images or videos (e.g., merchant voucher). Reader 314 (e.g., voucher reader, magstripe reader, chip or EMV reader, contactless card reader) can be configured to receive input data (e.g., voucher data, bitcoin data, magnetic stripe data, EMV data, NFC tap data, RFID data, activated data, digital wallet data) from a customer and analyze the input data to determine information such as what type of input it is (e.g., voucher, credit card, debit card, coupon, cryptocurrency, etc.), identifying information (e.g., the customer, the merchant, value, etc.), and other information. Receipt printer 316 can be configured to printer ATM receipts when an ATM session is concluded (e.g., the user can request for a receipt to not print). Input buttons 318 can be configured to receive input from a customer associated with common tasks performed at the ATM (e.g., quick cash, quick coins, quick voucher, and so on). Display 320 and 324 can be configured to display content. Camera 322 can be configured to capture photographs and record video.

Figure 3B:
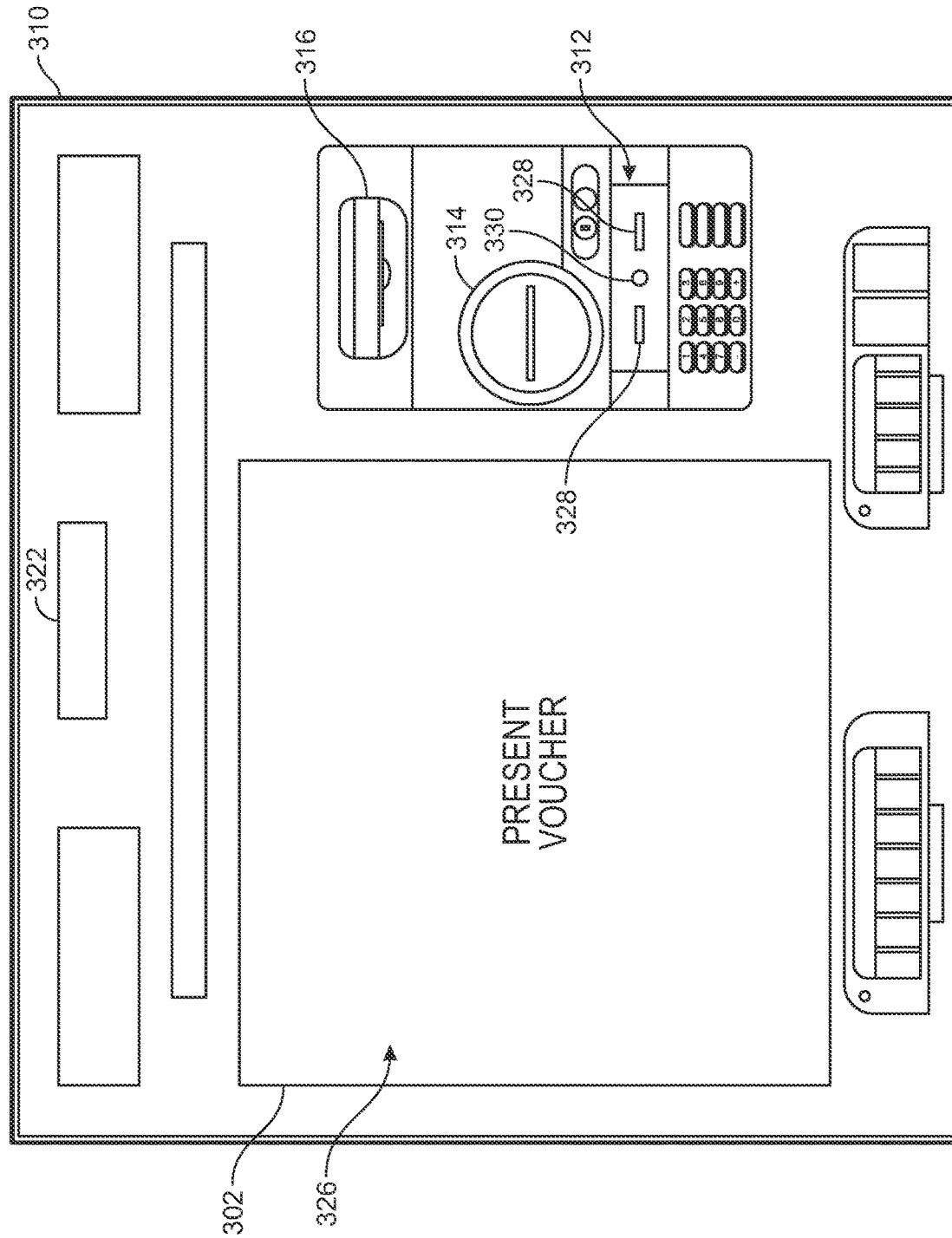

In example illustration FIG. 3B, once the customer selects "Present Voucher" the ATM interface 326 can display a present voucher screen. In some arrangements, an deactivated merchant voucher can be provided via reader 314, dispenser and intake 304, or microphone, speaker, camera input 312 (e.g., in particular, microphone/speaker 328, and camera 330). For example, the user device 140 and ATM 310 may establish a communication session (e.g., via network 130, private connection such as Bluetooth®, NFC) and provide a merchant voucher (e.g., digital) distributed by a merchant. In another example, a customer may feed a physical voucher into dispenser and intake 304 or tap the physical voucher on reader 314. In yet another example, the user device 140 may present (on its display) a merchant voucher scannable by camera 330. In yet another example, a customer may provide audio input of a merchant voucher identifier printed on the merchant voucher.

Figure 3C:
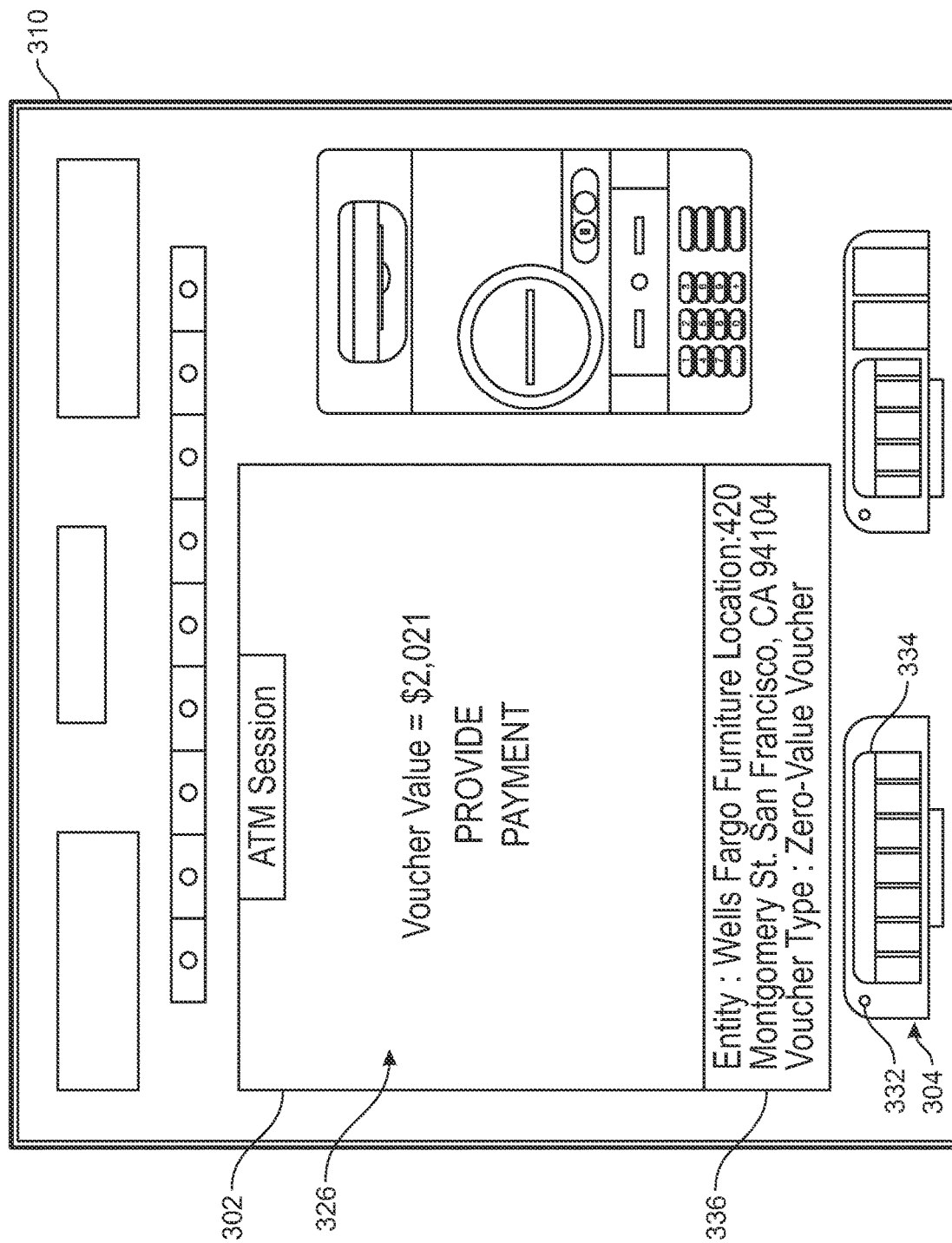

In example illustration FIG. 3C, upon receiving the merchant voucher the ATM 310 can initiate an ATM session and determine information of the merchant voucher (e.g., value, merchant (or entity), location, voucher-type). As shown, the determined value can be presented on ATM interface 326 and the ATM interface 326 can include an information (or informational) element 336 that can present information about the voucher such as, but not limited to, the merchant (or entity), location, and voucher type. Furthermore, as shown, the ATM interface 326 can request the customer to provide a payment (sometimes referred to herein as "deposit"). For example, when payment is requested the LED 332 can light up (e.g., blink, flash, solid) and input/output feed 334 can open to allow for cash (or other physical currency) to be deposited.

Figure 3D:
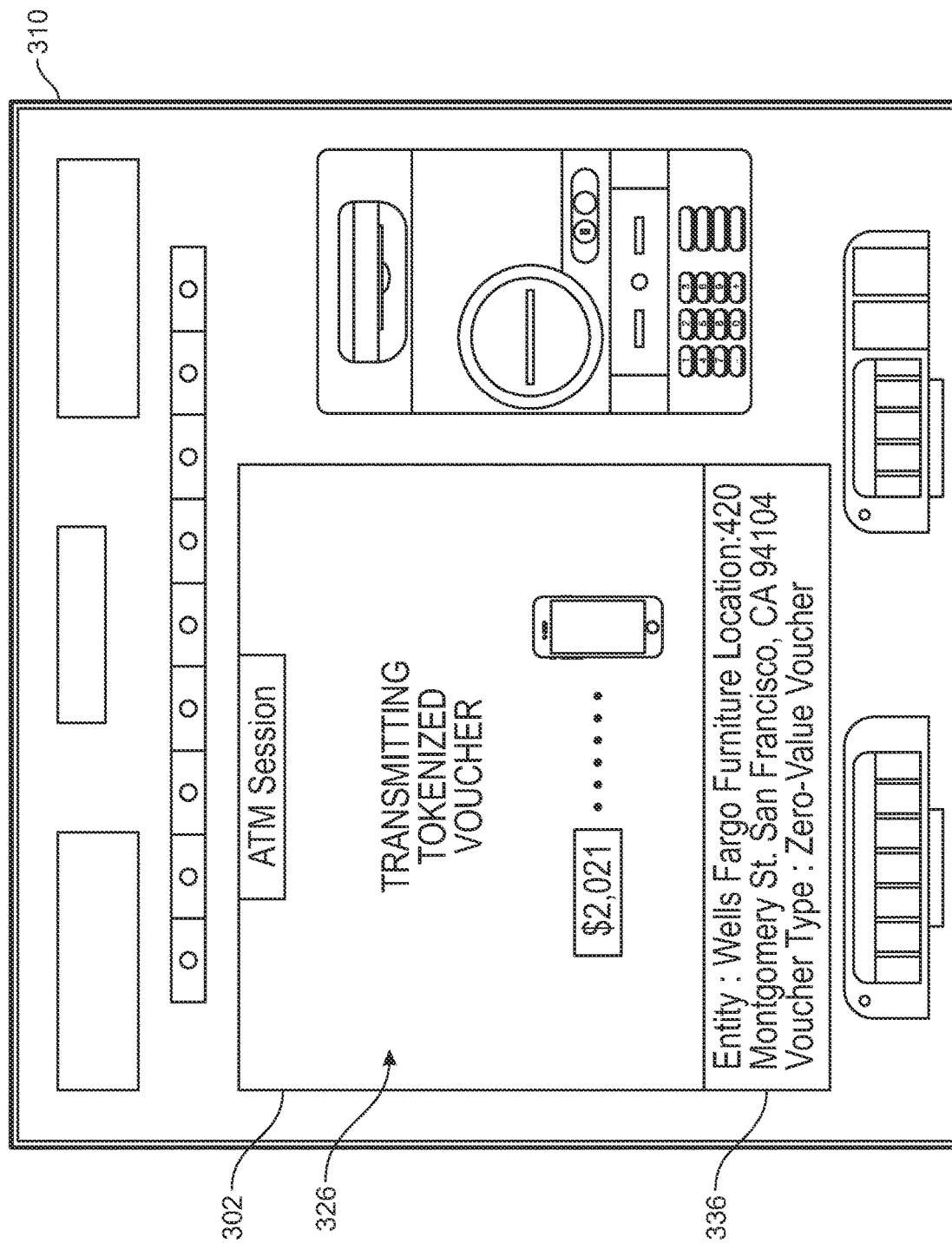

In example illustration FIG. 3D, the ATM interface 326 can present a transmitting activated voucher notification. In some arrangements, upon receiving of payment for the value of the voucher, the voucher processing system 112 (e.g., of ATM 110 or ATM 310) can generate an activated merchant voucher (i.e., at least one of a code or token). The network circuit 118 (e.g., of ATM 110 or 310) can transmit, via the communication session established with the user device, the activated merchant voucher. As described herein, the communication session may be over Bluetooth®, Wi-Fi, NFC, and so on.

Figure 3E:
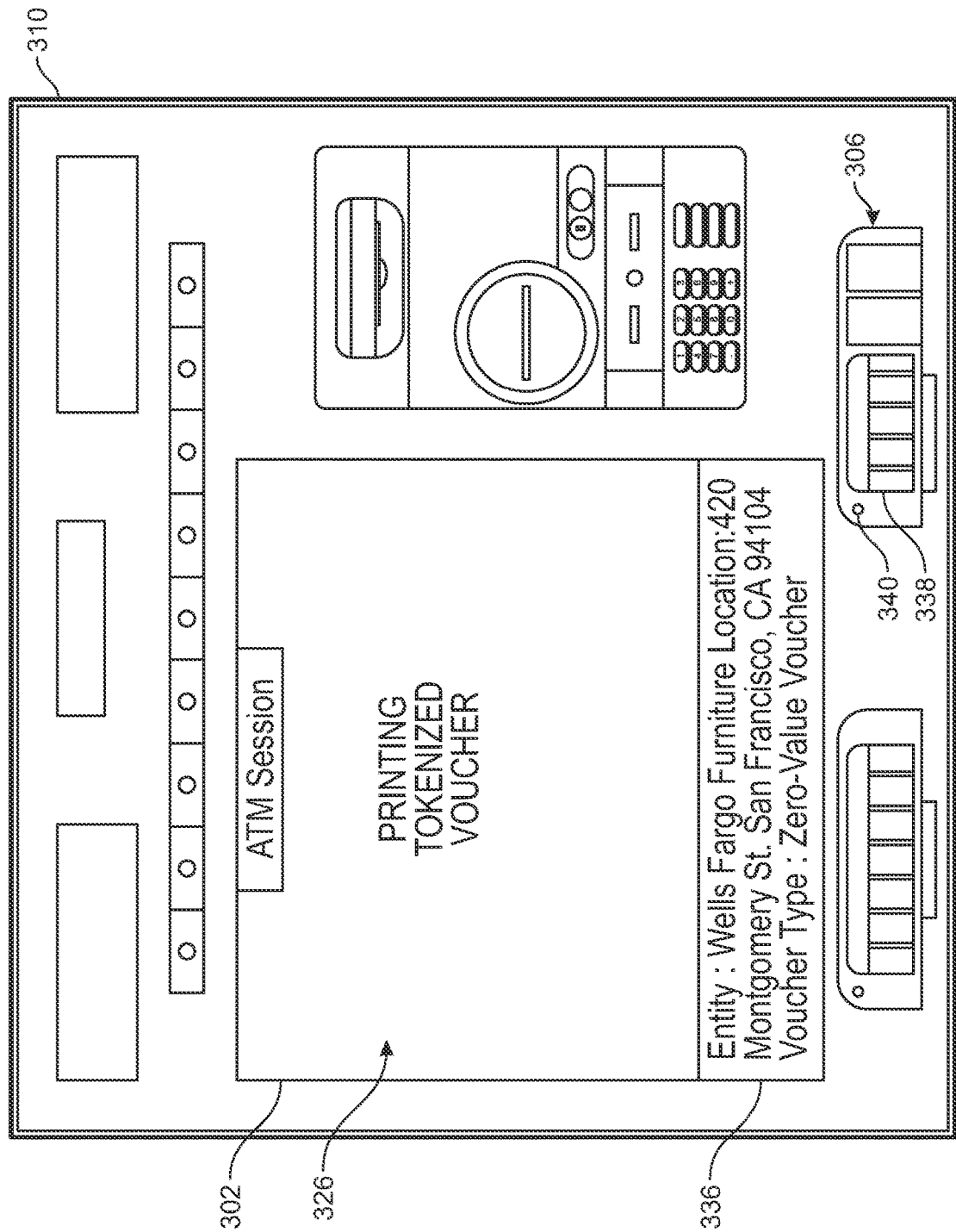

In example illustration FIG. 3E, the ATM interface 326 can present a printing activated voucher notification. In some arrangements, based on a user selection (e.g., via keyboard 308) the activated voucher can be printed and dispensed via printer 306. In particular, input/output feed 338 may open and LED 340 can light up (e.g., blink, flash, solid) indicating a activated merchant voucher is printing. Relative to the deactivated merchant voucher, the activated merchant voucher may include a barcode, QR code, stamp, or other identifier that may be read by the merchant computing system 150 (e.g., a point of sale) to indicate that the voucher is redeemable for a product/service and/or for an amount of funds that correspond to the deposit.

Figure 4A:
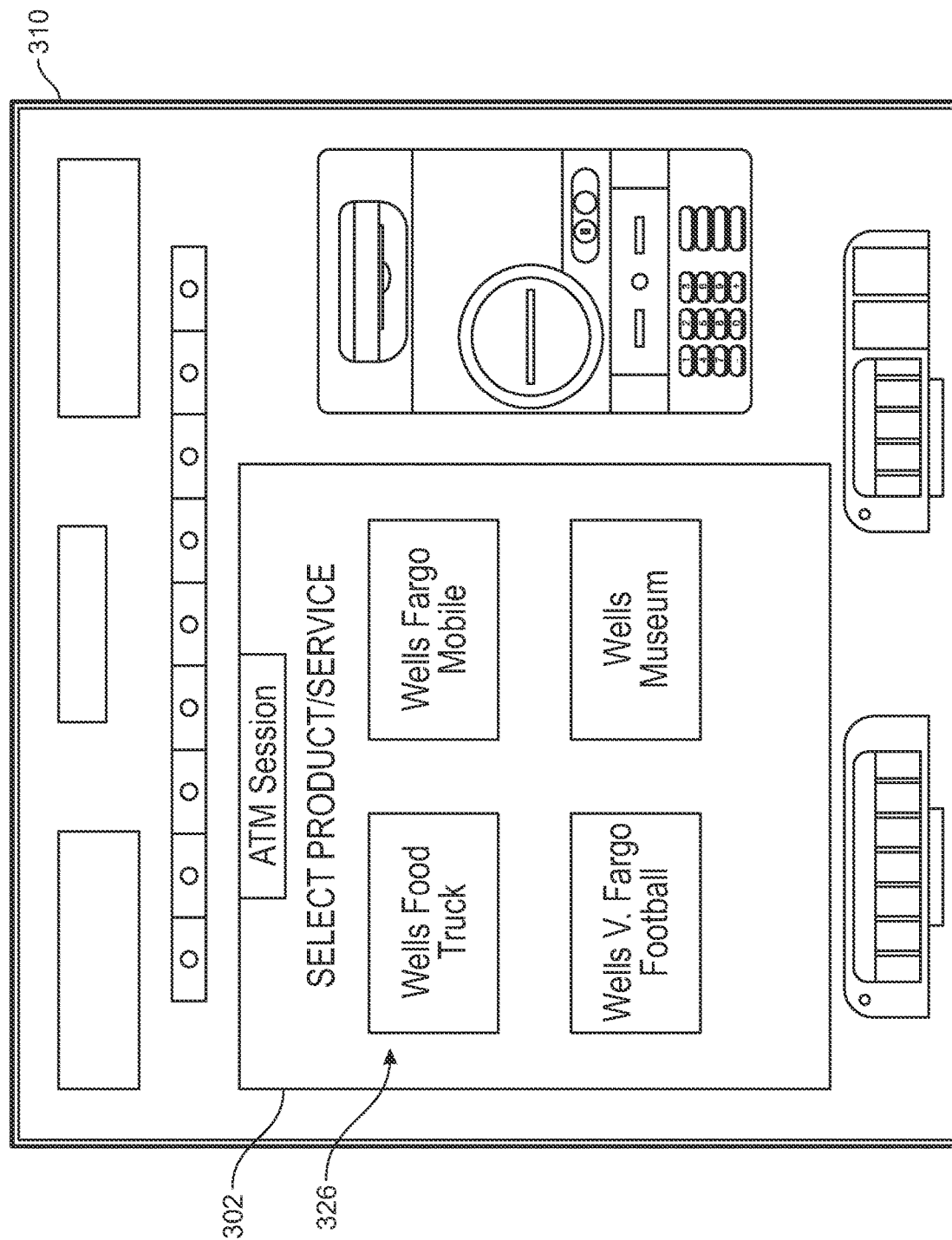
FIGS. 4A-4D are example graphical user interfaces that may be presented on the ATM of FIG. 1, according to some arrangements.

Referring to FIGS. 4A-4D in more detail, FIG. 4A illustrates an ATM 310 with a plurality of I/O devices (e.g., described in detail with reference to FIG. 3A) implemented by an I/O circuit (e.g., 117) and an ATM interface 326. As shown, with reference to FIG. 3A where the customer may select "Select Product/Service," an ATM session can be initiated and can present merchants on an ATM marketplace. The merchants can be geographically proximate to the ATM 310, such that each ATM 310 of the plurality of ATMs 110 can present a unique ATM interface 326 based on the location of the ATM. For example, if an ATM is located at 39.9012° N (latitude), 75.1720° W (longitude), the ATM may present a unique ATM interface of all the merchants within a 5 mile geographic area from the coordinate. In another example, if an ATM is located at 37.4720° N, 122.2429° W, the ATM may present a unique ATM interface of all the merchants within a 1 mile geographic area from the coordinate. Additional details and features are described above with reference to method 250 of FIG. 2B.

Figure 4B:
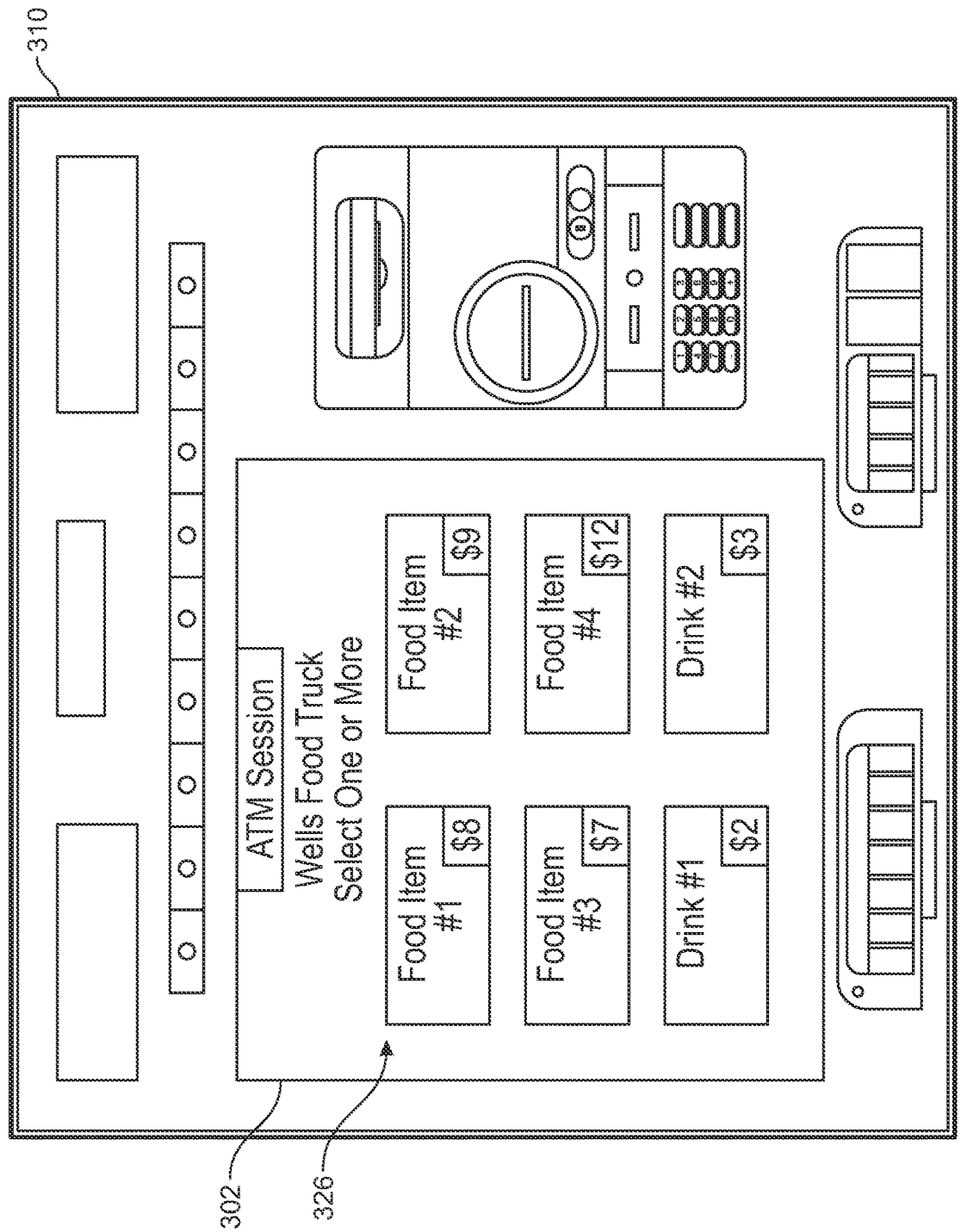

In example illustration FIG. 4B, once the customer selects a merchant from the merchant marketplace, the ATM 310 can generate and present to the customer interactive elements (or selectable elements) associated with one or more products and/or services to purchase on ATM interface 326. As shown, the one or more products and/or services may provide a description with a value. It should be understood, other information can be provided to select a product or service (e.g., seat selection from an event, financing opportunity (APR, interest rate, etc.), coupons, and so on). The interactive elements presented can be based on the product inventory data of the merchant stored and sorted in merchant dataset 124 of FIG. 1.

Figure 4C:
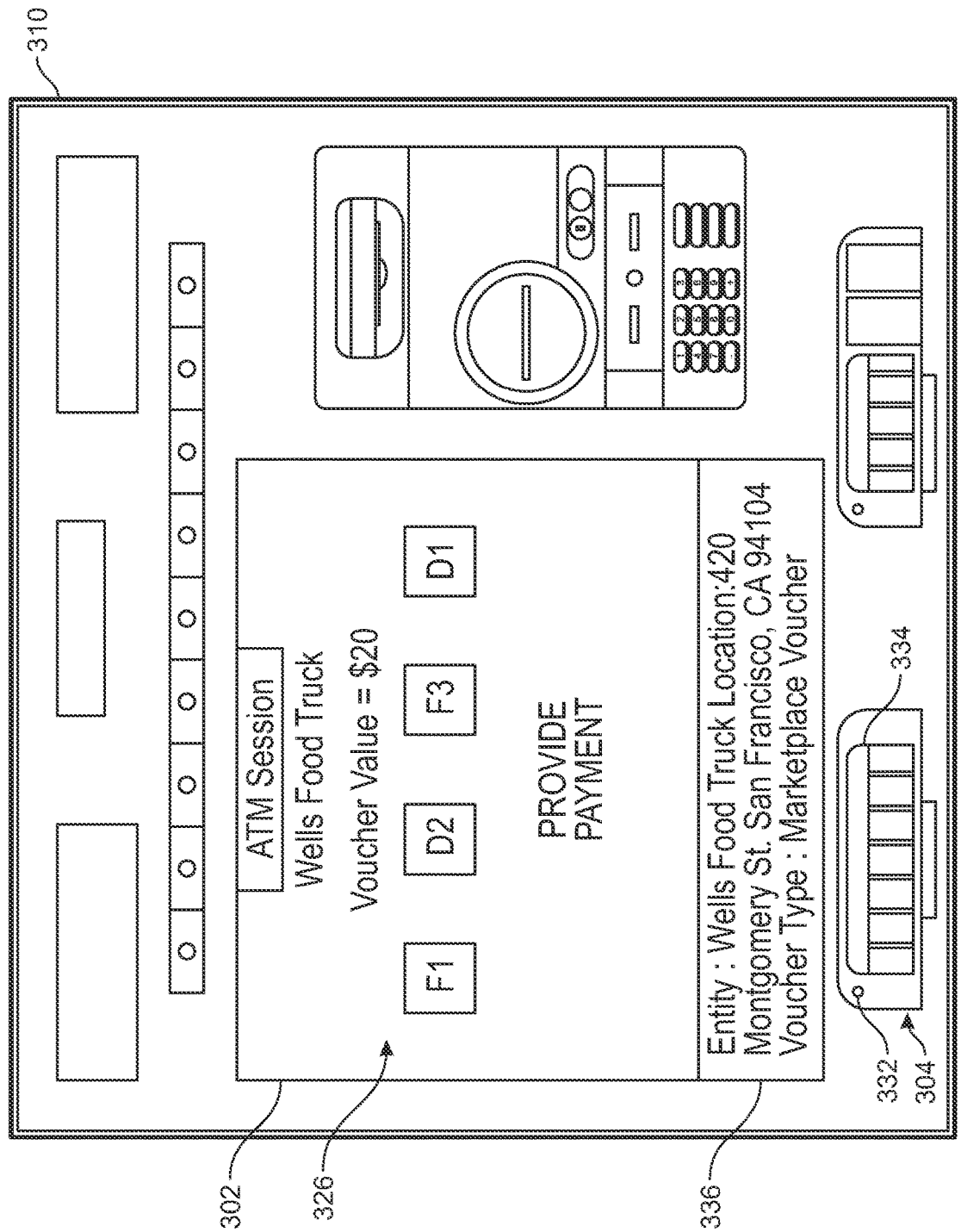

In example illustration FIG. 4C, upon receiving the selection of one or more interactive elements from the customer of one or more products, the ATM 310 can determine the value of the products and/or services based on cross-referencing the selected interactive elements with the merchant dataset 122 stored in ATM database 120 (e.g., provided by merchant computing system 150 as product inventory data). As shown, the determined value can be presented on ATM interface 326 and the ATM interface 326 can include an information element 336 that can present information about the voucher such as, but not limited to, the merchant (or entity), location, and the voucher type. Furthermore, as shown, the ATM interface 326 can request the customer to provide a payment. For example, when payment is requested the LED 332 can light up and input/output feed 334 can open to allow for cash (or other physical currency) to be deposited.

Figure 4D:
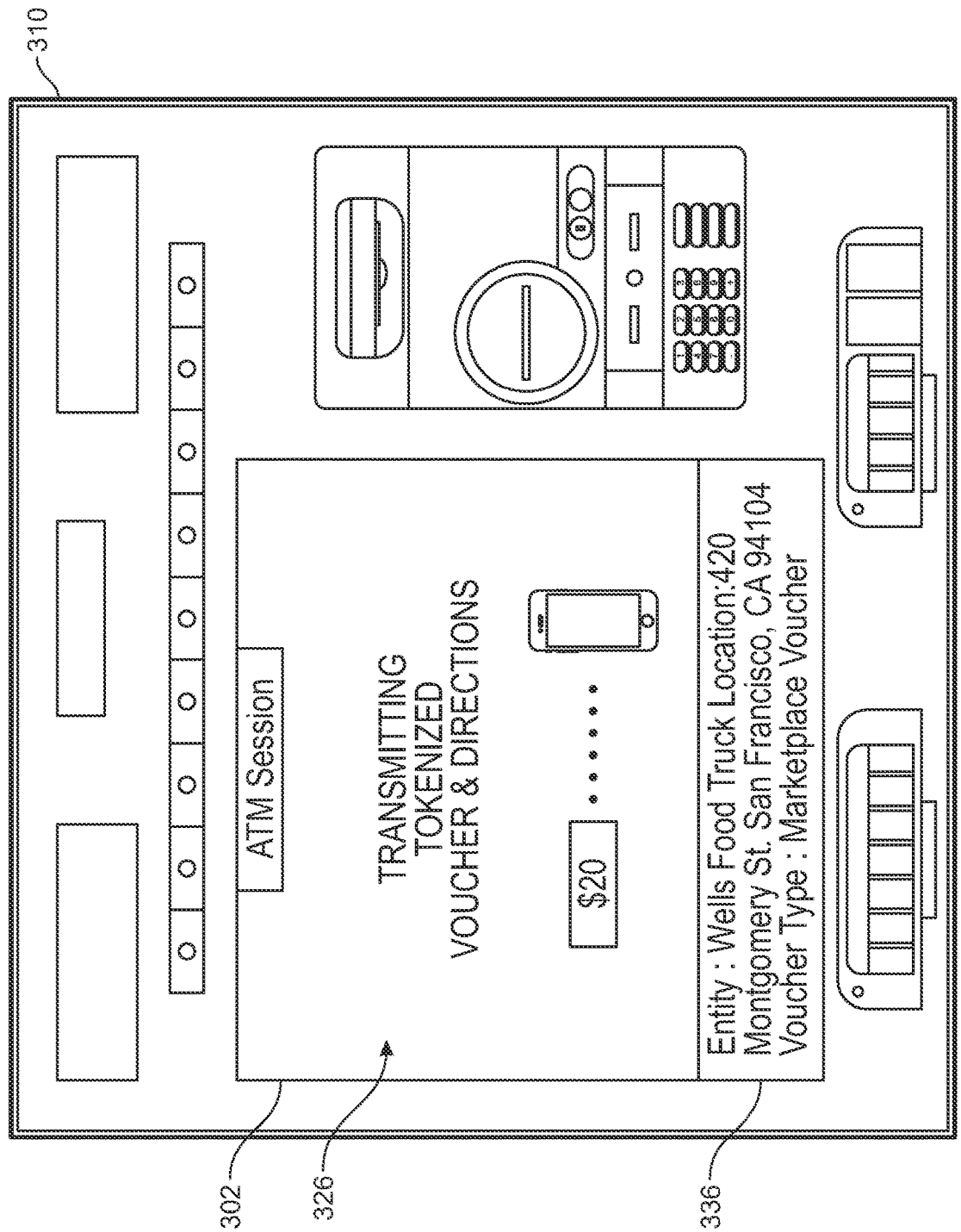

In example illustration FIG. 4D, the ATM interface 326 can present a transmitting activated voucher and directions notification. In some arrangements, upon receiving of payment for the value of the voucher, the voucher processing system 112 (e.g., of ATM 110 or ATM 310) can convert a merchant voucher. The network circuit 118 (e.g., of ATM 110 or 310) can transmit, via a communication session established with the user device, the activated merchant voucher. In some arrangements, the voucher processing system 112 can determine directions to the location of the merchant and transmit the directions via the communication session as well. In various arrangements, the directions can be automatically presented via a map application on the user device 140, such that the map application begins the route from the users current location to the merchant location.

Figure 5A:
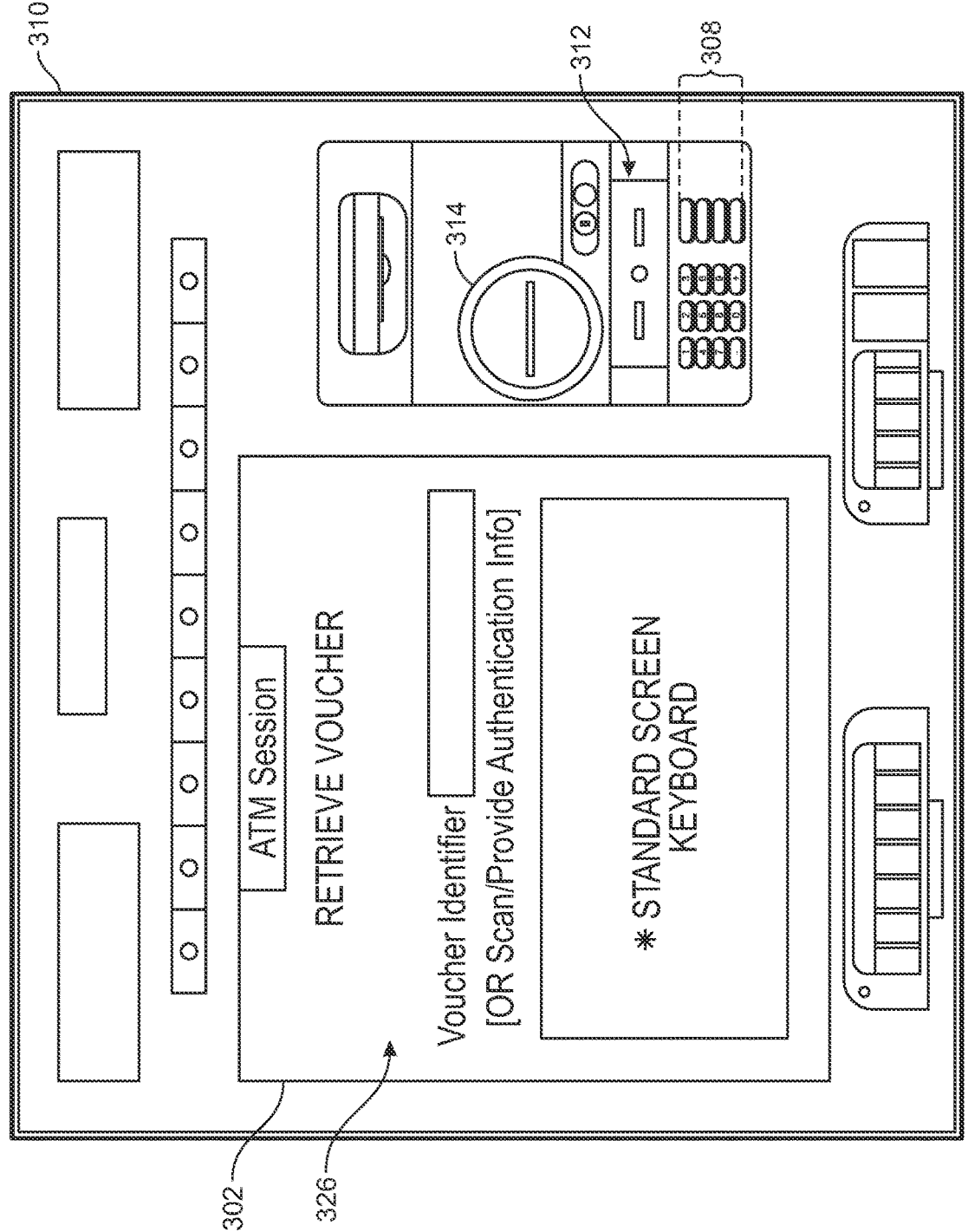
FIGS. 5A-5C are example graphical user interfaces that may be presented on the ATM of FIG. 1, according to some arrangements.
Figure 5B:
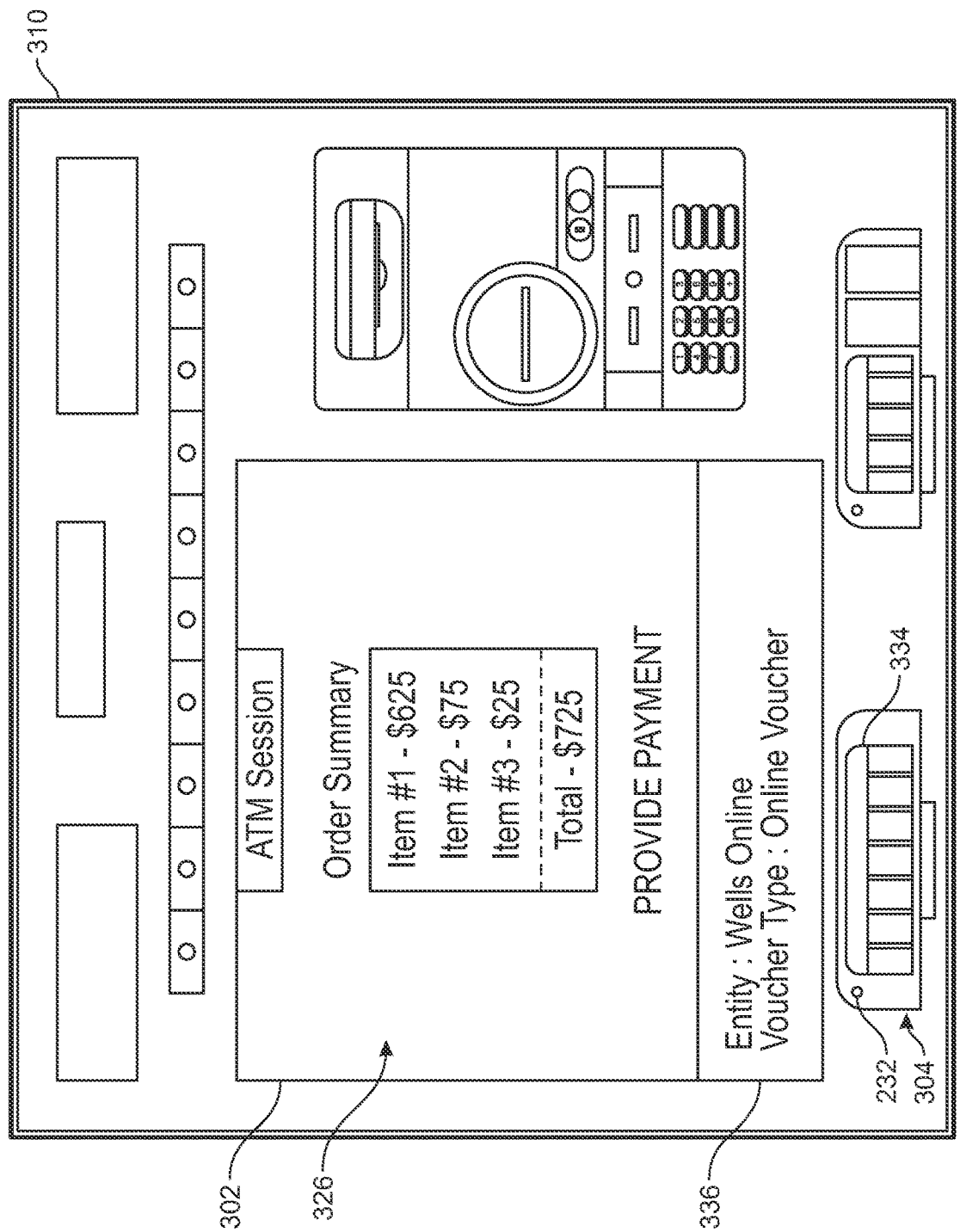
Figure 5C:
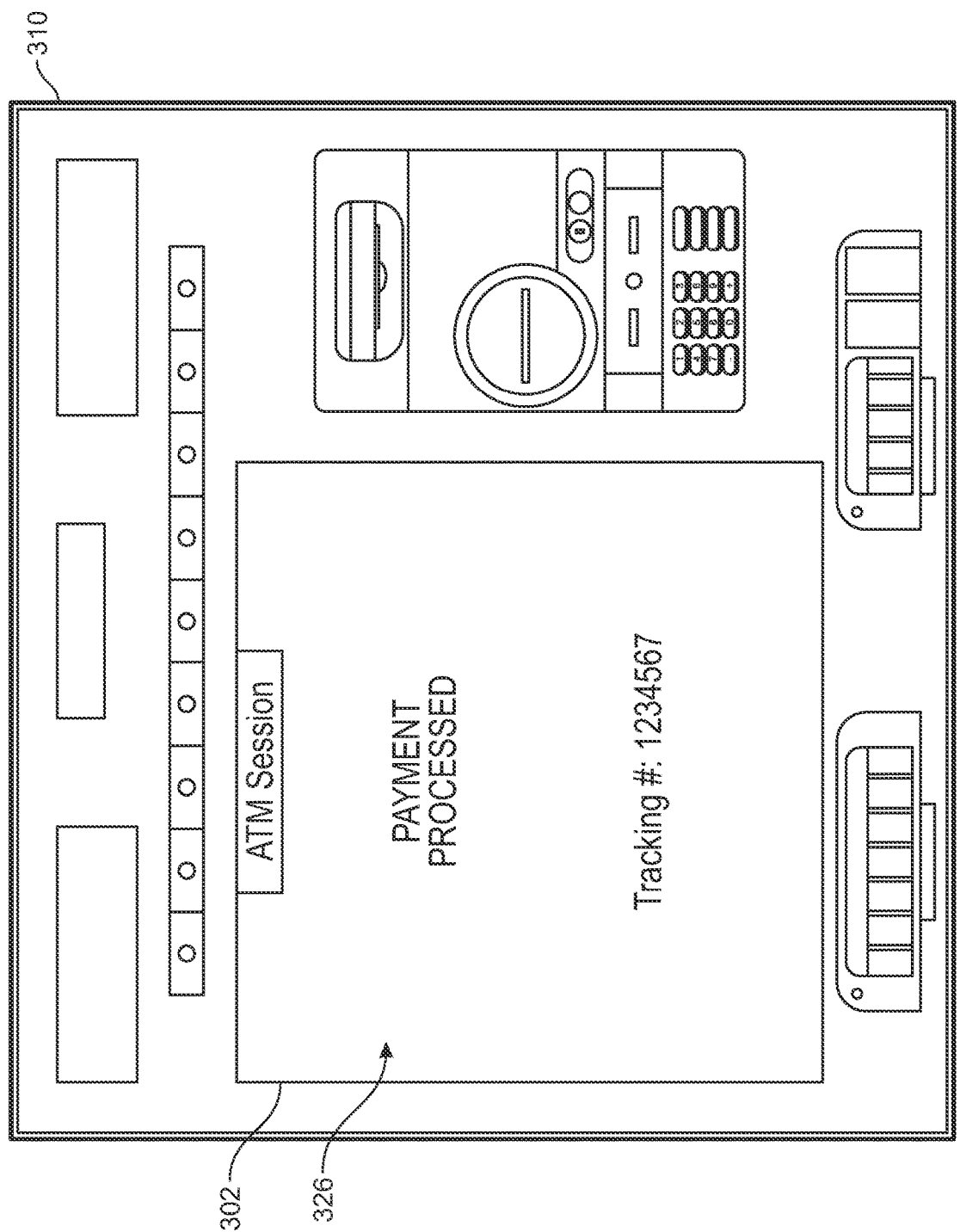

Referring to FIGS. 5A-5C in more detail, FIG. 5A illustrates an ATM 310 with a plurality of I/O devices (e.g., described in detail with reference to FIG. 3A) implemented by an I/O circuit (e.g., 117) and an ATM interface 326. As shown, with reference to FIG. 3A where the customer may select "Retrieve Voucher," an ATM session can be initiated and request a voucher identifier, scan, or authentication information of the customer. For example, when a user desires to pay for an online order using physical currency the merchant can provide the customer a voucher that can be used to pay for the online order. In some arrangements, the user can provide a voucher identifier via a touchscreen keyboard on ATM interface 326, via keyboard 308, via microphone, speaker, camera input 312, via reader 314, and so on. For example, the user may type the voucher identifier via keyboard 308 or the on-screen keyboard. In another example, the user may provide an account identifier associated with the online order, or authentication information of the user (e.g., address). In yet another example, the user may swipe a card (e.g., loyalty card) associated with the merchant to retrieve the merchant voucher. Additional details and features are described above with reference to method 290 of FIG. 2C.

In example illustration FIG. 5B, the ATM 310 can determine the order and provide an order summary and requesting payment on ATM interface 326. In some arrangements, the network circuit 118 may communicate with the merchant (e.g., over network 130) to determine the order and value of each items associated with the order (e.g., including tax). In some arrangements, the ATM 310 can determine the value of the products and/or services based on cross-referencing the order with the merchant dataset 122 stored in ATM database 120. As shown, the determined value can be presented on ATM interface 326 and the ATM interface 326 can include an information element 336 that can present information about the voucher such as, but not limited to, the merchant (or entity) and the voucher type. Furthermore, as shown, the ATM interface 326 can request the customer to provide a payment. For example, when payment is requested the LED 332 can light up and input/output feed 334 can open to allow for physical currency to be deposited.

In example illustration FIG. 5C, the ATM interface 326 can present a payment processed notification indicating the payment was received and processed, and provide a tracking number for the order. For example, the tracking number may be delivery service tracking information generated upon receiving payment. In some arrangements, ATM 310 can interface (over network 130) with a delivery service computing system (e.g., data sources 160) and provide delivery information and a fee and the delivery service computing system can provide a tracking number in response. The tracking number can also be transmitted by the network circuit 118, via a communication session established with the user device.

Figure 6:
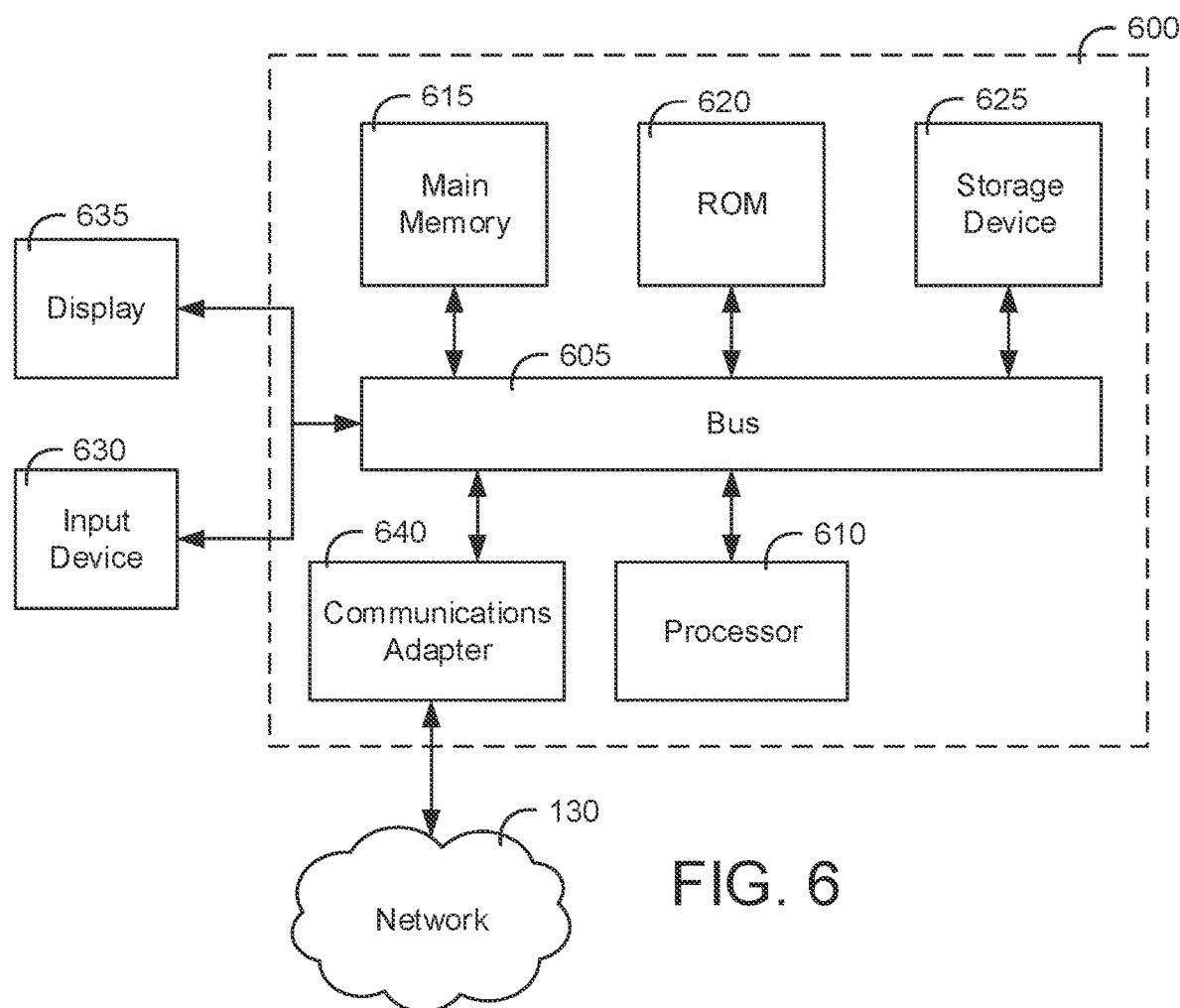
FIG. 6 is a block diagram illustrating an example computing system suitable for use with various components of FIG. 1 according to the various arrangements described herein.

Referring now to FIG. 6, a depiction of a computer system 600 is shown. The computer system 600 can be used/be representative of a computing system for at least one the ATM 110, user devices 140, merchant computing systems 150, data sources 160, and/or provider computing system 170. The computing system 600 includes a bus 605 or other communication component for communicating information and a processor 610 coupled to the bus 605 for processing information. The computing system 600 also includes main memory 615, such as a random-access memory (RAM) or other dynamic storage device, coupled to the bus 605 for storing information, and instructions to be executed by the processor 610. Main memory 615 can also be used for storing position information, temporary variables, or other intermediate information during execution of instructions by the processor 610. The computing system 600 may further include a read only memory (ROM) 620 or other static storage device coupled to the bus 605 for storing static information and instructions for the processor 610. A storage device 625, such as a solid-state device, magnetic disk, or optical disk, is coupled to the bus 605 for persistently storing information and instructions.

The computing system 600 may be coupled via the bus 605 to a display 635, such as a liquid crystal display, or active-matrix display, for displaying information to a user. An input device 630, such as a keyboard including alphanumeric and other keys, may be coupled to the bus 605 for communicating information, and command selections to the processor 610. In another arrangement, the input device 630 has a touch screen display 635. The input device 630 can include any type of biometric sensor, a cursor control, such as a mouse, a trackball, or cursor direction keys, for communicating direction information and command selections to the processor 610 and for controlling cursor movement on the display 635.

In some arrangements, the computing system 600 may include a communications adapter 640, such as a networking adapter. Communications adapter 640 may be coupled to bus 605 and may be configured to enable communications with a computing or communications network 130 and/or other computing systems. In various illustrative arrangements, any type of networking configuration may be achieved using communications adapter 640, such as wired (e.g., via Ethernet), wireless (e.g., via Wi-Fi, Bluetooth®), satellite (e.g., via GPS) pre-configured, ad-hoc, LAN, WAN.

According to various arrangements, the processes that effectuate illustrative arrangements that are described herein can be achieved by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. In alternative arrangements, hard-wired circuitry may be used in place of or in combination with software instructions to implement illustrative arrangements. Thus, arrangements are not limited to any specific combination of hardware circuitry and software.

That is, although an example processing system has been described in FIG. 6, arrangements of the subject matter and the functional operations described in this specification can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the arrangements of FIG. 6 as singular, stand-alone devices, one of ordinary skill in the art will appreciate that, in some arrangements, the computing system 600 may include virtualized systems and/or system resources. For example, in some arrangements, the computing system 600 may be a virtual switch, virtual router, virtual host, virtual server. In various arrangements, computing system 600 may share physical storage, hardware, and other resources with other virtual machines. In some arrangements, virtual resources of the network 130 (e.g., network 130 of FIG. 1) may include cloud computing resources such that a virtual resource may rely on distributed processing across more than one physical processor, distributed memory, etc.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. An automated teller machine (ATM) comprising:
at least one processing circuit configured to:
communicably couple to one or more merchant computing systems associated with one or more merchants;
receive a product inventory dataset associated with one or more merchants from the one or more merchant computing systems;
establish a continuous active communication session with a user device via at least one short-range wireless communication between the user device and the at least one processing circuit, wherein the continuous active communication session remains active based on a location of the user device being within a threshold distance of the ATM;
receive, via a display interface of the ATM, an input initiating an ATM session;
generate and present, during the continuous active communication session and via the display interface of the ATM, a graphical user interface comprising a plurality of interactive elements associated with a plurality of products of the product inventory dataset;
receive, during the continuous active communication session and via the display interface, a selection of at least one interactive element of the plurality of interactive elements regarding at least one product of the plurality of products;
receive a deposit for a value of the selection;
generate at least one code or token that includes information encrypted using a private key of a public and private key pair of the ATM and is embedded with a value associated with the deposit and a unique identifier; and
transmit, via the continuous active communication session and to the user device, the at least one code or token for a transaction regarding the at least one product of the plurality of products.

2. The ATM of claim 1, wherein the at least one processing circuit is further configured to:
update the product inventory dataset, wherein the product inventory dataset comprises an amount of inventory associated with each product of the plurality of products.

3. The ATM of claim 2, wherein the at least one processing circuit is further configured to:
establish, utilizing a first application programming interface (API), a first communication session between the one or more merchant computing systems and the at least one processing circuit, wherein the at least one processing circuit and the one or more merchant computing systems exchange information via the first API.

4. The ATM of claim 3, wherein the at least one processing circuit is further configured to:
monitor, the one or more merchant computing systems via the first API in real-time or near real-time, to obtain an update in product inventory of the plurality of products; and
in response to identifying an update in the product inventory, update, in real-time or near real-time, the product inventory dataset.

5. The ATM of claim 1, wherein the at least one processing circuit is further configured to:
  establish, utilizing a second application programming interface (API), the continuous active communication session between the user device and the at least one processing circuit, wherein the at least one processing circuit and the user device exchange information via the second API.

6. The ATM of claim 1, further comprising:
  a printer comprising an output feed configured to print and dispense a code of the at least one code or token, wherein the code comprises a scannable identifier.

7. The ATM of claim 1, wherein the at least one processing circuit is further configured to:
  generate and present, via the display interface of the ATM, a plurality of merchants associated with the product inventory dataset, wherein the selection comprises at least two products of the plurality of products, and wherein the at least two products are associated with at least two merchants, wherein the at least one code or token includes a first code or a first token associated with a first product of the at least two products and a second code or second token associated with a second product of the at least two products;
  wherein the transmission to the user device of the at least one code or token includes a first transmission of the first code or first token and a second transmission of the second code or second token, wherein the first transmission is separate from the second transmission.

8. The ATM of claim 7, wherein the at least one code or token includes the first code and the second code, wherein the first code is one of a quick response code or a bar code, and wherein the second code is one of a quick response code or a bar code.

9. The ATM of claim 8, wherein the first code or first token is different from the second code or second token.

10. The ATM of claim 7, wherein the at least one processing circuit is further configured to:
  present, via the display interface, a payment request for the at least two products associated with the at least two merchants;
  determine a value of a product of the at least two products associated with a first merchant;
  determine a value of a product of the at least two products associated with a second merchant; and
  update a ledger of each merchant of the at least two merchants, wherein updating the ledger comprises escrowing the value of the products of the at least two products associated with the first merchant and escrowing the value of the at least two products associated with the second merchant.

11. A computer-implemented method for ATM recycling operations, the computer-implemented method comprising:
  communicably coupling, by one or more processing circuits, to one or more merchant computing systems associated with one or more merchants;
  receiving, by the one or more processing circuits, a product inventory dataset associated with one or more merchants from the one or more merchant computing systems;
  establishing a continuous active communication session with a user device via at least one short-range wireless communication between the user device and the one or more processing circuits, wherein the continuous active communication session remains active based on a location of the user device being within a threshold distance of the ATM;
  receiving, by the one or more processing circuits via a display interface of the ATM, an input initiating an ATM session;
  generating and presenting, by the one or more processing circuits during the continuous active communication session and via the display interface of the ATM, a graphical user interface comprising a plurality of interactive elements associated with a plurality of products of the product inventory dataset;
  receiving, by the one or more processing circuits and during the continuous active communication session and via the display interface, a selection of at least one interactive element of the plurality of interactive elements regarding at least one product of the plurality of products;
  receiving, by the one or more processing circuits, a deposit for a value of the selection;
  generating, by the one or more processing circuits, at least one code or token that includes information encrypted using a private key of a public and private key pair of the ATM and is embedded with a value associated with the deposit and a unique identifier; and
  transmitting, by the one or more processing circuits via the continuous active communication session and to the user device, the at least one code or token for a transaction regarding the at least one product of the plurality of products.

12. The computer-implemented method of claim 11, further comprising:
  updating, by the one or more processing circuits, the product inventory dataset, wherein the product inventory dataset comprises an amount of inventory associated with each product of the plurality of products.

13. The computer-implemented method of claim 12, further comprising:
  establishing, by the one or more processing circuits utilizing a first application programming interface (API), a first communication session between the one or more merchant computing systems and the one or more processing circuits, wherein the one or more processing circuits and the one or more merchant computing systems exchange information via the first API.

14. The computer-implemented method of claim 11, further comprising:
  monitoring, by the one or more processing circuits, the one or more merchant computing systems via the first API in real-time or near real-time, to identify an update in product inventory of the plurality of products; and
  in response to identifying an update in the product inventory, updating, by the one or more processing circuits in real-time or near real-time, the product inventory dataset.

15. The computer-implemented method of claim 11, further comprising:
  establishing, by the one or more processing circuits utilizing a second application programming interface (API), the continuous active communication session between the user device and the one or more processing circuits, wherein the one or more processing circuits and the user device exchange information via the second API.

16. The computer-implemented method of claim 11, the method further comprising:
  generating and presenting, by the one or more processing circuits via the display interface of the ATM, a plurality of merchants associated with the product inventory dataset, wherein the selection comprises at least two products of the plurality of products, and wherein the at least two products are associated with at least two merchants, wherein the at least one code or token includes a first code or a first token associated with a first product of the at least two products and a second code or second token associated with a second product of the at least two products;

wherein the transmission to the user device of the at least one code or token includes a first transmission of the first code or first token and a second transmission of the second code or second token, wherein the first transmission is separate from the second transmission;

wherein the at least one code or token includes the first code and the second code, wherein the first code is one of a quick response code or a bar code, and wherein the second code is one of a quick response code or a bar code.

17. The computer-implemented method of claim 16, further comprising:

presenting, by the one or more processing circuits via the display interface, a payment request for the at least two products associated with the at least two merchants;

determining, by the one or more processing circuits, a value of a product of the at least two products associated with a first merchant;

determining, by the one or more processing circuits, a value of a product of the at least two products associated with a second merchant; and updating, by the one or more processing circuits, a ledger of each merchant of the at least two merchants, wherein updating the ledger comprises escrowing the value of the products of the at least two products associated with the first merchant and escrowing the value of the at least two products associated with the second merchant.

18. One or more non-transitory computer-readable storage media having instructions stored thereon that, when executed by at least one processing circuit, cause the at least one processing circuit to:

communicably couple to one or more merchant computing systems associated with one or more merchants;

receive a product inventory dataset associated with one or more merchants from the one or more merchant computing systems;

establish a continuous active communication session with a user device via at least one short-range wireless communication between the user device and the at least one processing circuit, wherein the continuous active communication session remains active based on a location of the user device being within a threshold distance of an automated teller machine (ATM);

receive, via a display interface of the ATM, an input initiating an ATM session;

generate and present, during the continuous active communication session and via the display interface of the ATM, a graphical user interface comprising a plurality of interactive elements associated with a plurality of products of the product inventory dataset;

receive, during the continuous active communication session and via the display interface, a selection of at least one interactive element of the plurality of interactive elements regarding at least one product of the plurality of products;

receive a deposit for a value of the selection;

generate at least one code or token that includes information encrypted using a private key of a public and private key pair of the ATM and is embedded with a value associated with the deposit and a unique identifier; and transmit, via the continuous active communication session and to the user device, the at least one code or token for a transaction regarding the at least one product of the plurality of products.

19. The one or more non-transitory computer-readable storage media of claim 18, having additional instructions stored thereon that, when executed by the at least one processing circuit, cause the at least one processing circuit to:

update the product inventory dataset, wherein the product inventory dataset comprises an amount of inventory associated with each product of the plurality of products;

establish, utilizing a first application programming interface (API), a first communication session between the one or more merchant computing systems and the at least one processing circuit, wherein the at least one processing circuit and the one or more merchant computing systems exchange information via the first API;

monitor, the one or more merchant computing systems via the first API in real-time or near real-time, product inventory of the plurality of products; and in response to identifying an update in the product inventory, update, in real-time or near real-time, the product inventory dataset.

20. The one or more non-transitory computer-readable storage media of claim 18, having additional instructions stored thereon that, when executed by the at least one processing circuit, cause the at least one processing circuit to:

generate and present, via the display interface of the ATM, a plurality of merchants associated with the product inventory dataset, wherein the selection comprises at least two products of the plurality of products, and wherein the at least two products are associated with at least two merchants, wherein the at least one code or token includes a first code or a first token associated with a first product of the at least two products and a second code or second token associated with a second product of the at least two products;

wherein the transmission to the user device of the at least one code or token includes a first transmission of the first code or first token and a second transmission of the second code or second token, wherein the first transmission is separate from the second transmission.

* * * * *